United States Patent [19]

Payne et al.

[11] 4,282,422

[45] Aug. 4, 1981

[54] POWER CONTROL FOR APPLIANCE USING MULTIPLE HIGH INRUSH CURRENT ELEMENTS

[75] Inventors: Thomas R. Payne, Louisville, Ky.; Alfred L. Baker, Longmount, Colo.

[73] Assignee: General Electric Company, Louisville, Ky.

[21] Appl. No.: 8,452

[22] Filed: Feb. 1, 1979

[51] Int. Cl.³ ............................................. H05B 1/02
[52] U.S. Cl. ................................. 219/486; 219/492; 219/490; 219/464; 323/319; 361/37; 307/40
[58] Field of Search ............... 219/483, 485, 486, 490, 219/492, 497, 501, 506, 508, 464, 10.77; 307/39–41, 252 UA; 323/18, 22, 24; 361/37

[56] References Cited

U.S. PATENT DOCUMENTS

| | | | |
|---|---|---|---|
| 3,541,429 | 11/1970 | Martin et al. | 323/18 X |
| 3,855,452 | 12/1974 | Flaza et al. | 219/486 |
| 3,912,905 | 10/1975 | Giler | 219/464 |
| 3,944,790 | 3/1976 | Tamaro et al. | 219/492 |
| 3,946,200 | 3/1976 | Juodikis | 219/497 |
| 3,974,472 | 8/1976 | Gould, Jr. | 219/506 |
| 4,010,412 | 3/1977 | Forman | 307/41 |
| 4,046,991 | 9/1977 | Sefton et al. | 219/497 |
| 4,078,168 | 3/1978 | Kelly | 219/497 |
| 4,135,122 | 1/1979 | Holmquist et al. | 219/492 |
| 4,160,153 | 7/1979 | Melander | 219/492 |
| 4,168,491 | 9/1979 | Phillips et al. | 307/41 |

Primary Examiner—Gerald P. Tolin
Assistant Examiner—M. Paschall
Attorney, Agent, or Firm—Bernard J. Lacomis; Radford M. Reams

[57] ABSTRACT

A power control system is disclosed which controls the power output of one or more resistive heating elements in response to operator selected power level settings. Control of power to the elements is accomplished by generating a multi-bit binary word representing a selected power level, each bit being operative to control the application of power to the element during a different control interval. A control word is generated for each element and is updated once during every associated control period, a period comprising a number of intervals equal to the number of heating elements. The heating elements are of a type which draw a relatively high current during a transient heat-up period. The application of power to other elements is inhibited when one of the elements is having power applied thereto during its transient period. Power control for each element is staggered by testing a bit of different positional value in each word during any given interval.

25 Claims, 26 Drawing Figures

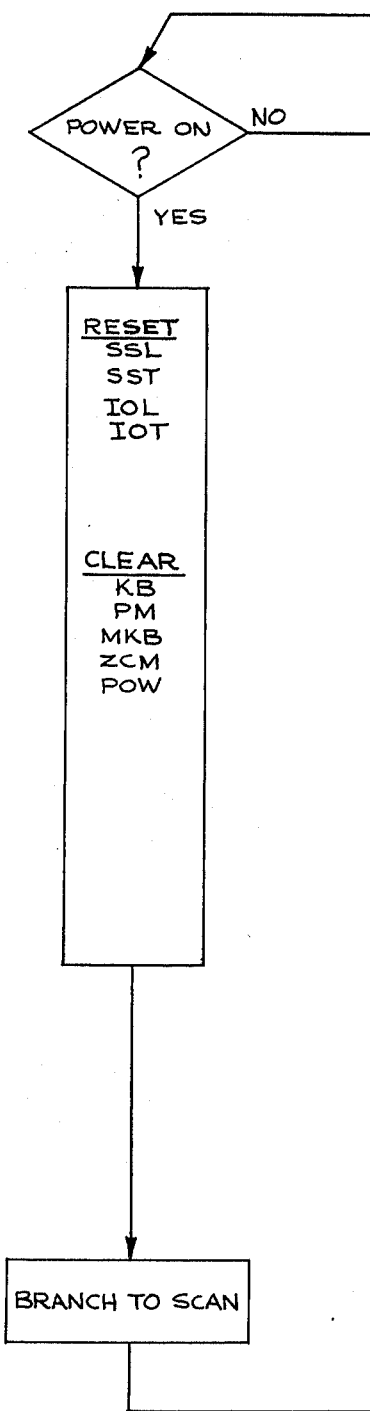
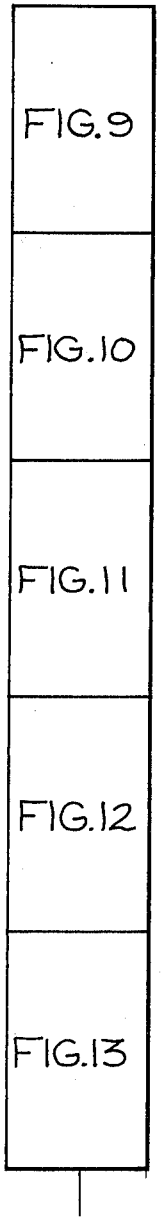
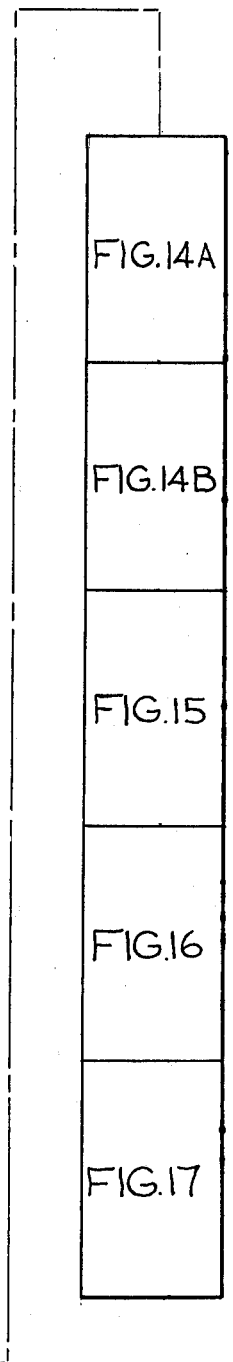
FIG. 8
FIG. 9

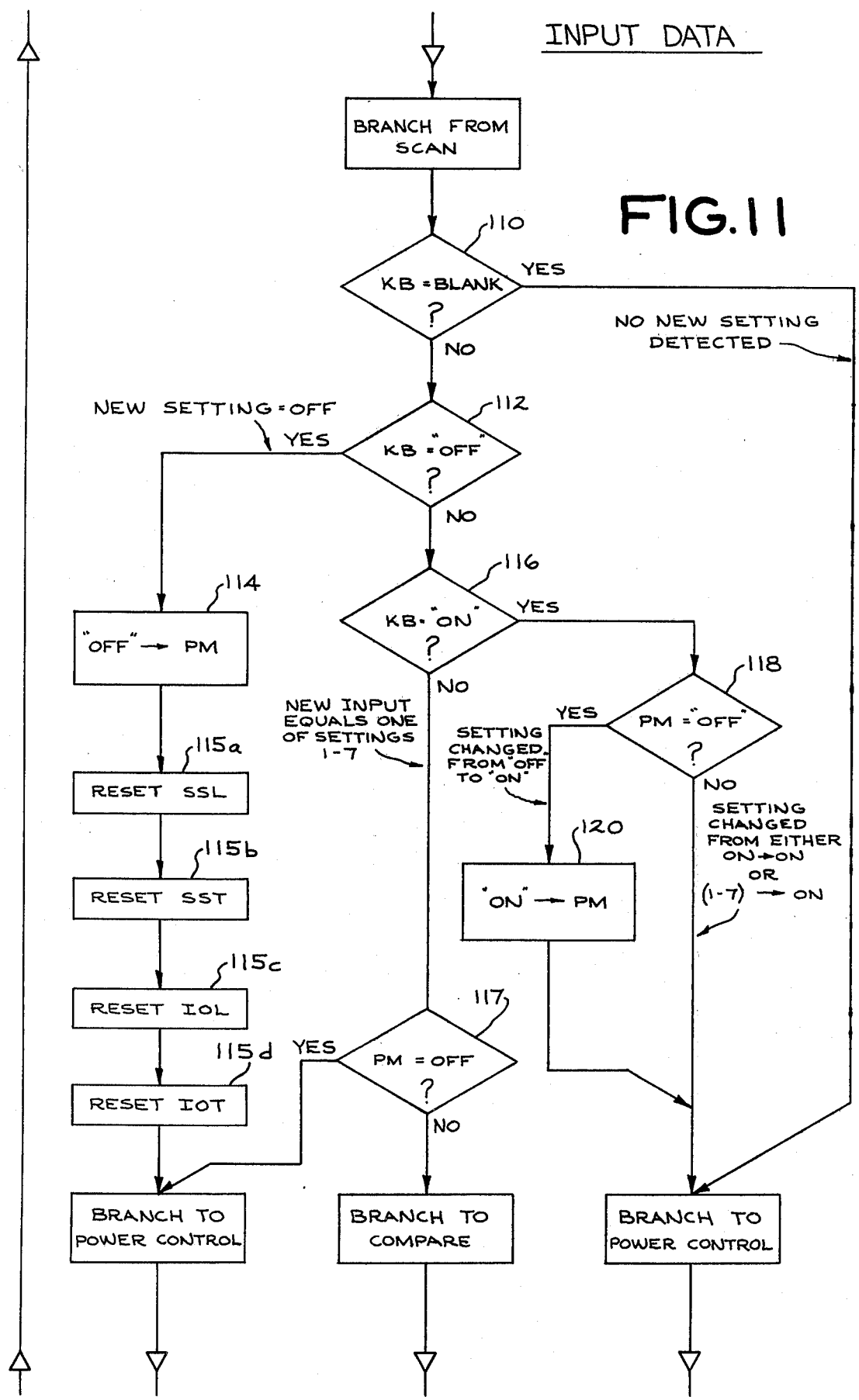

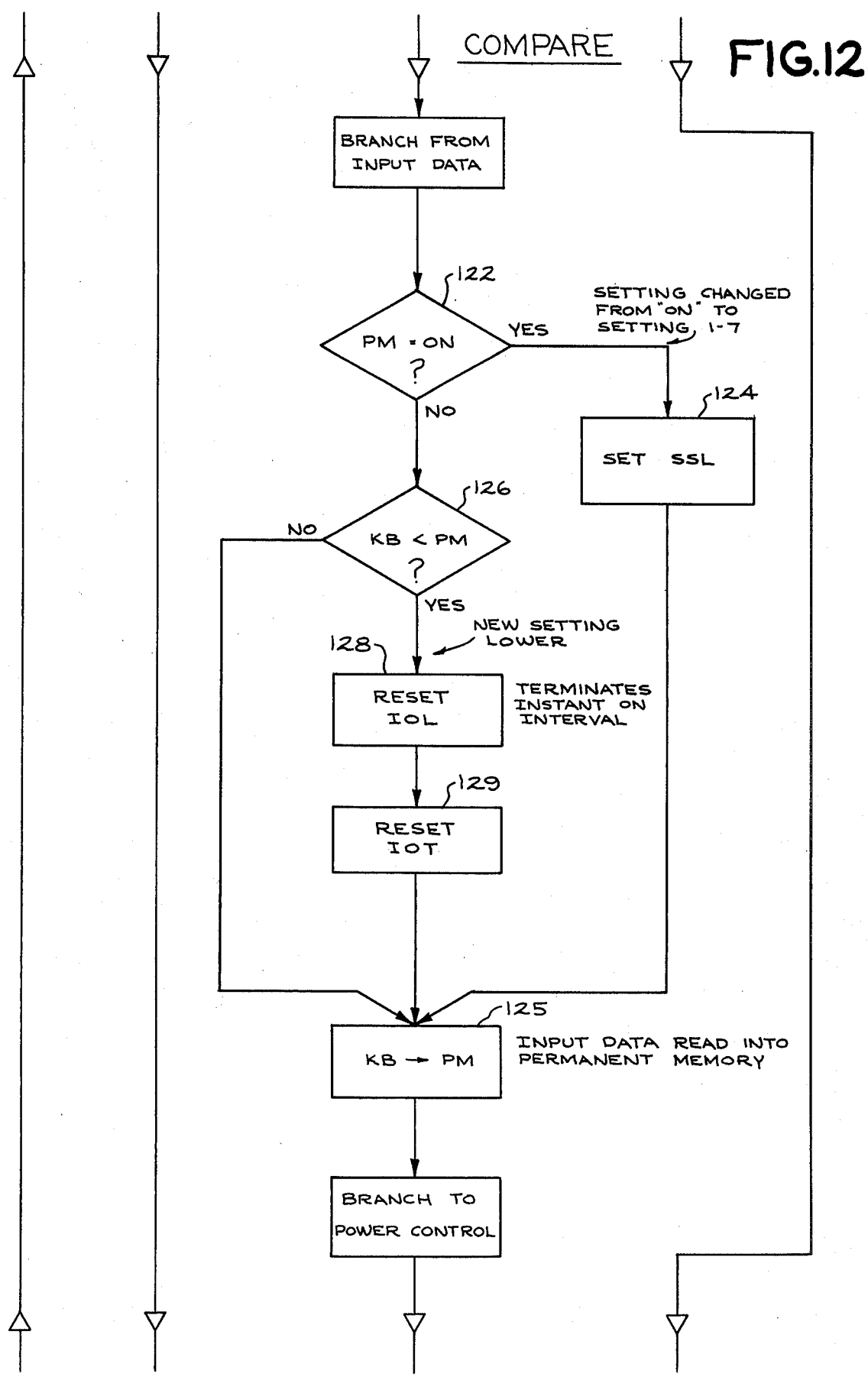

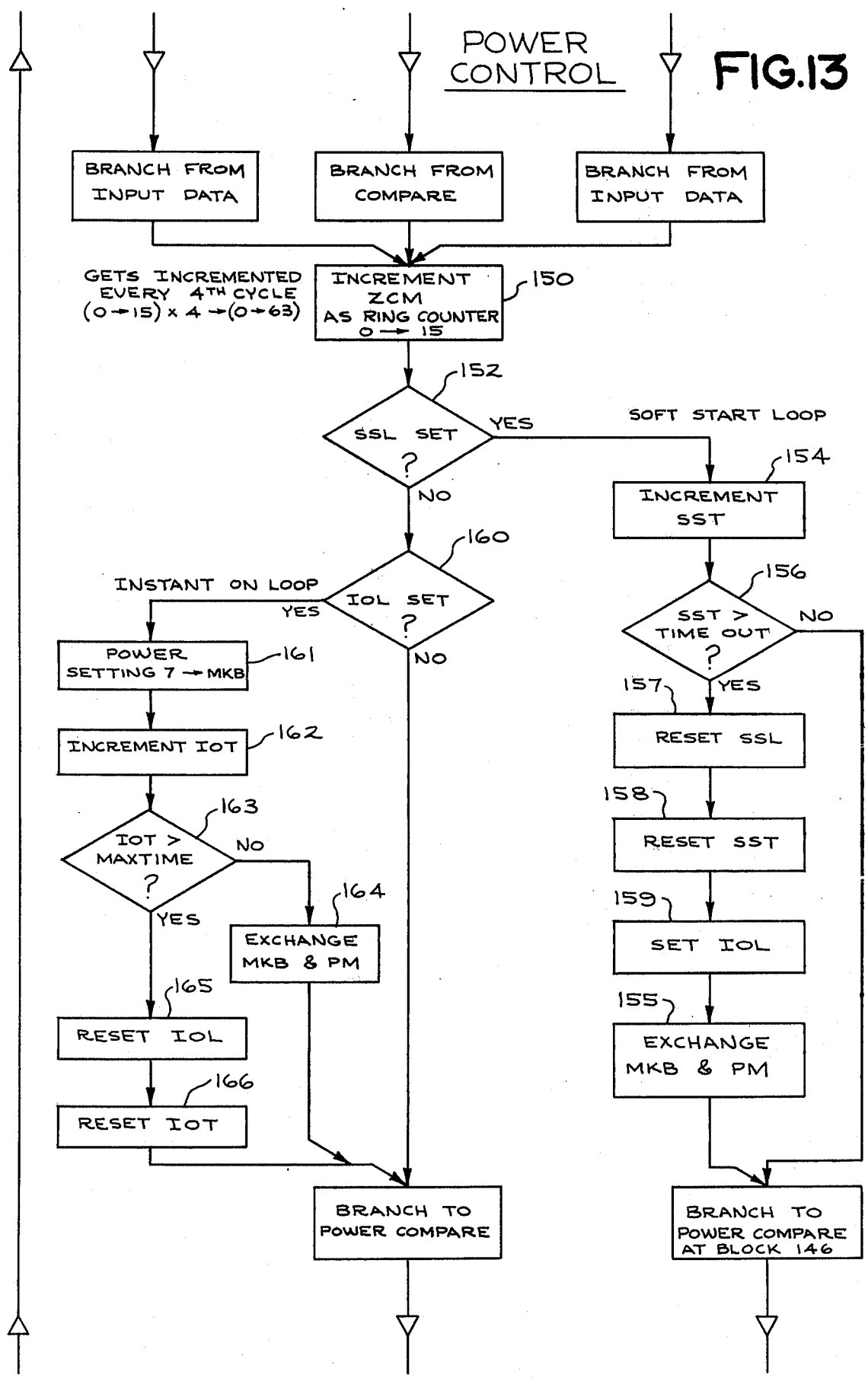

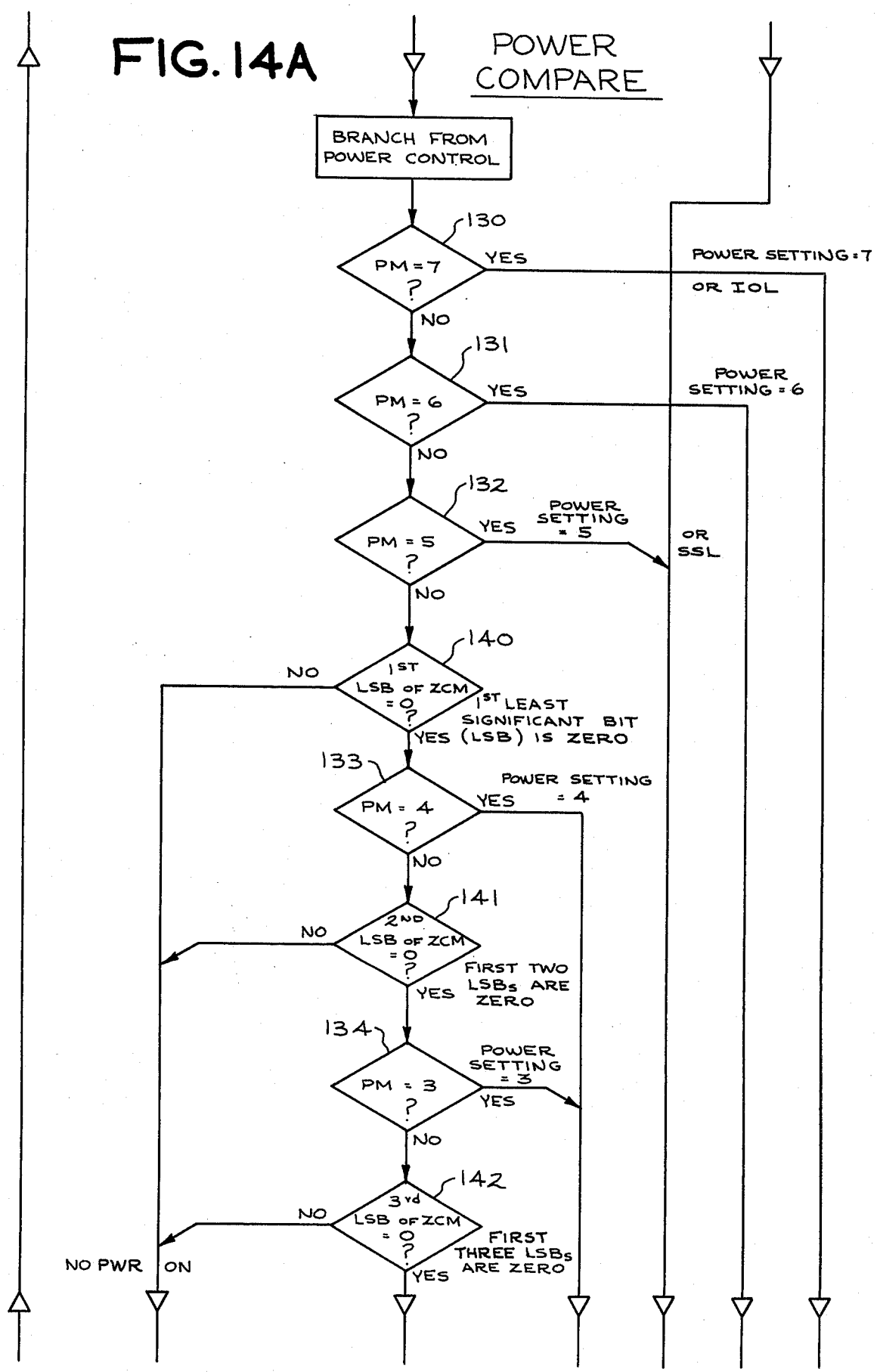
FIG. 14A — POWER COMPARE

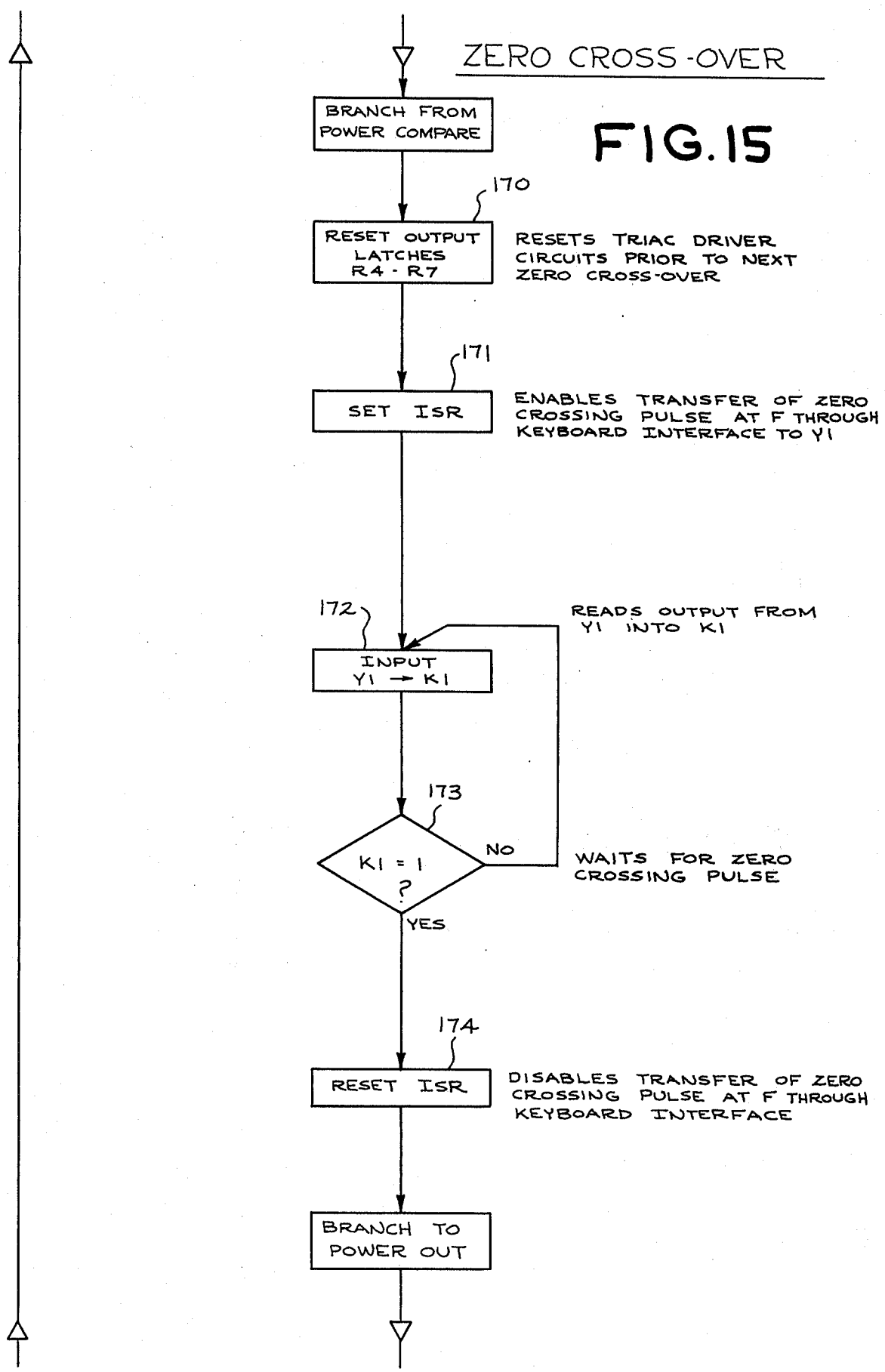

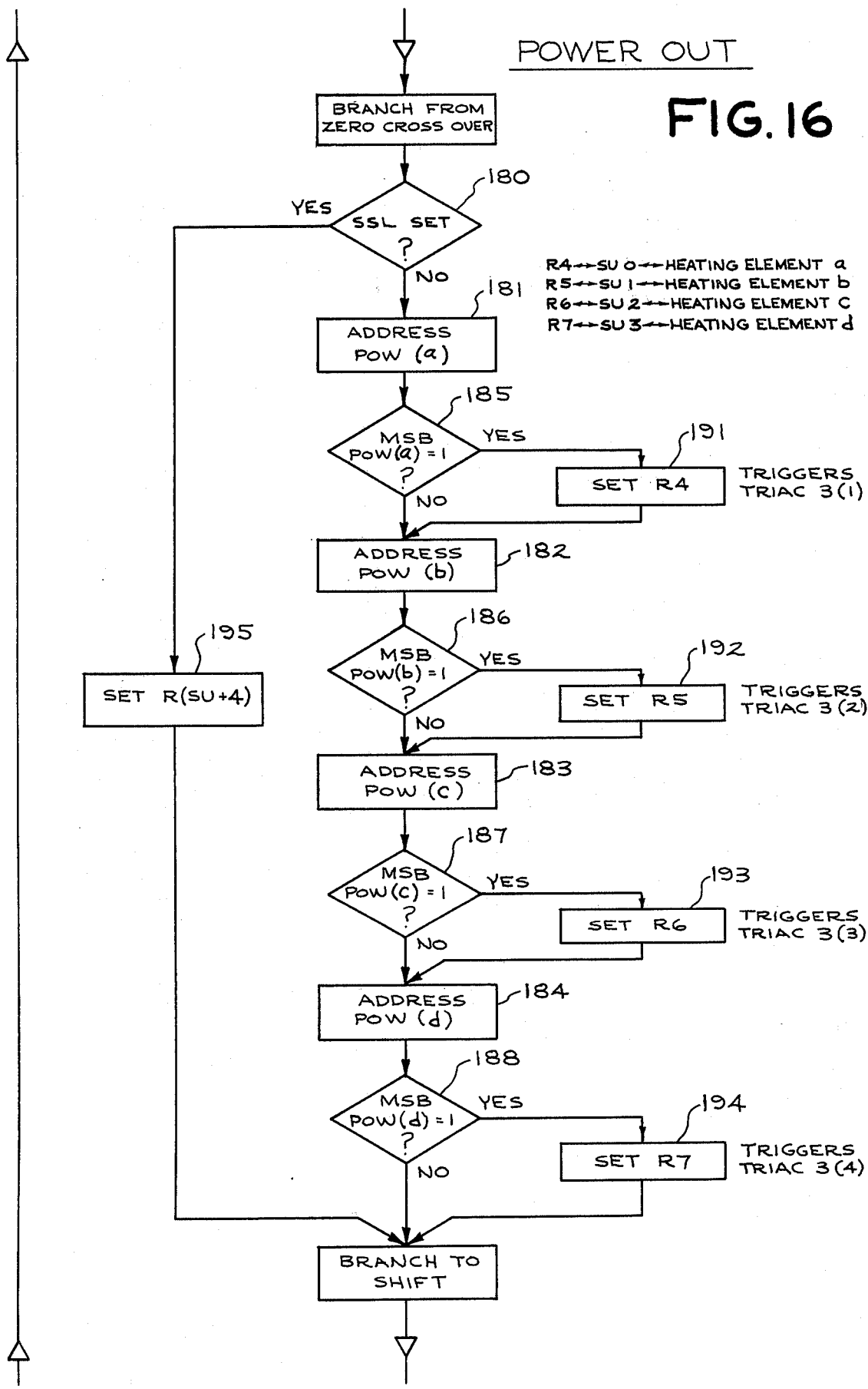

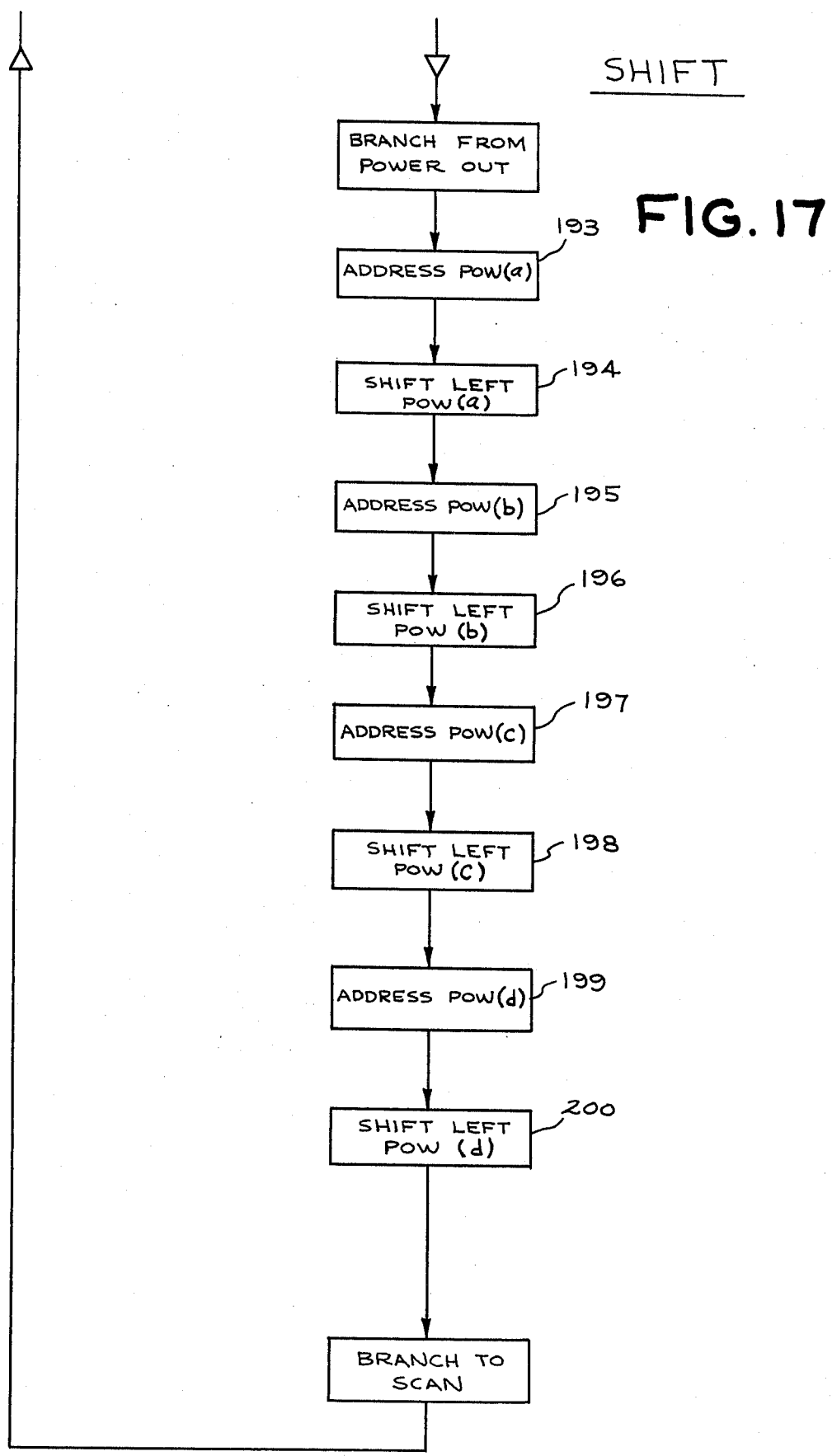

POWER CONTROL FOR APPLIANCE USING MULTIPLE HIGH INRUSH CURRENT ELEMENTS

CROSS REFERENCES TO RELATED APPLICATIONS

This application is related to the following commonly assigned, copending applications: Ser. No. 8,376, "Power Control for Appliance Using High Inrush Current Element," filed in the name of Thomas R. Payne; Ser. No. 8,356, "Improved Power Control for Appliance Using High Inrush Current Element," filed in the names of Thomas R. Payne and Alfred L. Baker; Ser. No. 8,360, "Repetition Rate Power Control for Appliance Using High Current Inrush Elements," filed in the names of Thomas R. Payne and Alfred L. Baker.

The disclosures of the above-noted related applications are hereby incorporated by reference.

BACKGROUND OF THE INVENTION

Use of glass ceramic plates as cooktops in electric cooking apparatus is becoming increasingly common. Among the advantages of this smooth cooking surface is its pleasing appearance and easy cleanability. However, due to the high thermal impedance of the glass ceramic plate, such cooktops are less efficient thermally than conventional cooking surfaces using sheathed heating elements.

Due to unique electrical and thermal characteristics possessed by materials such as molybdenum disilicide ($MoSi_2$) and tungsten, resistive heating elements made from these materials are attractive for use with glass ceramic cooktops. The high positive temperature coefficient of resistivity, low thermal mass, and low specific heat characteristic of $MoSi_2$ and tungsten and the high operating temperature achievable using heating elements made from these materials provide the potential for improved thermal efficiency for cooking apparatus which incorporate a glass ceramic cooktop. However, these same dynamic electrical and thermal characteristics create power control problems which have thus far rendered the use of heating elements made from these materials impractical in electric cooking apparatus.

Conventionally, power control in electric cooking apparatus is achieved using temperature sensitive switches, such as bimetalic infinite heat switches. In operation, the operator adjusts the switch to provide the desired cooking temperature. The switch remains closed until the heating element reaches a predetermined temperature. The switch then opens and remains open until the element temperature drops to a predetermined temperature. The switch continues to cycle ON and OFF in this manner indefinitely. Since conventional sheathed heating elements heat up and cool down relatively slowly, these switching cycles are relatively long, ranging from a few seconds to thirty seconds. In addition, the resistance of a conventional sheathed heating element changes only slightly in going from room temperature to operating temperature. Since the resistance of conventional heating elements is relatively independent of temperature in the temperature range of interest, transient current surges when the switches close are minimal. Thus, conventional power control techniques work satisfactorily.

However, the dynamic characteristics of resistive heating elements made from $MoSi_2$ or tungsten prevent these heating elements from being controlled, using conventional control techniques. Firstly, a $MoSi_2$ heating element, as described generally in U.S. Pat. No. 3,912,905, designed for use in a cooking appliance, typically varies in resistance from 1 to 1½ ohms at room temperature to 12 ohms at an operating temperature of approximately 1000° C. Thus, assuming energization from a standard 120 volt AC household supply, as the temperature of the heating element changes from room temperature to operating temperature, the load current changes from an initial peak of roughly 110 amps to a steady state current on the order of 8.5 amps RMS. This initial current of 110 amps is obviously greater than can be tolerated in a household appliance except for extremely brief periods. Secondly, the heating element cools extremely rapidly; the first time constant for thermal response of this heating element being in the 600–1000 millisecond range. Since the element cools rapidly with a concurrent drop in resistance, excessive current surges may occur even during steady state operation because the resistance of the element may drop between applications of power to a level which draws excessive current during each subsequent application of power. Therefore, a very rapid switching capability which enables the use of brief ON times to limit the duration of excessive current during the heat-up of the element and brief OFF times to prevent unacceptable drops in resistance during steady state operation by limiting cooling of the element between ON times is required to avoid frequent excessive current surges.

Clearly, the relatively slow mechanical switching of the conventionally employed infinite heat switches cannot provide the rapid switching required to prevent excessive current flow during each application of power. Similarly, conventional electronic controls for use with conventional heating elements in cooling appliances have been designed to employ relatively long ON and OFF periods.

The above-described current surge problems for a hotplate type apparatus employing a single $MoSi_2$ type resistive heating element are addressed in concurrently filed, commonly-assigned applications Ser. No. 8,376, filed in the name of Thomas R. Payne, entitled "Power Control for Appliances Using High Inrush Current Element," and Ser. No. 8,376, filed in the names of Thomas R. Payne and Alfred L. Baker, entitled "Repetition Rate Power Control for Appliances Using High Current Inrush Elements," which disclosures are hereby incorporated by reference. The control circuits disclosed in the above-noted applications may be used in an electric range employing multiple heating elements, four heating elements in a range cooktop being a common arrangement. In such an arrangement, a control circuit is provided for each heating element which operates independently of the others. However, the potential total current overload problems which result due to the use of multiple elements, both during transient start-up operation, steady state operation and those instances where one or more elements is operating in steady state operation and one or more is undergoing transient start-up operation, are not addressed in the above-noted applications. In the event all four elements are undergoing start-up simultaneously, total peak currents on the order of 440 amps could be drawn by the system. In addition, the transient surge current drawn by even a single heating element operating in the Soft Start mode may overload the system when added to the current drawn by other elements operating in the Steady State. Finally, when several elements are operating in the Steady State mode, the total current surges drawn by the system may interfere with power service to other electrical devices in the home, causing disturbing effects such as flickering in the intensity of room lighting.

OBJECTS OF THE INVENTION

Accordingly, it is a principal object of the present invention to provide a power control system for use with multiple heating element cooking apparatus employing resistive heating elements made of $MoSi_2$, tungsten or similar materials which electronically controls power in a manner which minimizes recurring current surges during normal operation.

A further object of the present invention is the provision of a power control system for use with multiple resistive heating elements which draw relatively high current (above normal household maximums) upon the application of power at room temperature.

A further object of the present invention is the provision of a rapidly switching power control system which coordinates the control of each heating element to minimize total peak current drawn by the multiple elements of a cooking apparatus during steady state operation to minimize interference with the distribution of power to other household devices.

A further object is the provision of a power control system for an electric range in which total peak current is minimized in Steady State operation by coordinating power control for each of a plurality of heating elements by operating each element out of phase with each of the other heating elements by at least one power cycle.

A further object is the provision of a power control system for an electric range which coordinates control of the multiple resistive heating elements to minimize the total current drawn by the multiple heating element cooking apparatus when one or more of the individual heating elements is energized at room temperature.

A further object is the provision of a power control system for an electric range having multiple heating elements of the above-noted type which responds to power setting changes from an OFF setting to any one of several power settings by controlling power to the heating element according to a Soft Start mode during a first preselected time in which power is applied to the heating element independently of the power setting selected so as to prevent an initial current overload in the individual heating element circuit and which inhibits power to any of the other heating elements when power is applied to a heating element operating in the Soft Start mode to prevent overloading the total current surging capacity of the multiple heating element systems.

SUMMARY OF THE INVENTION

These objects are accomplished in the present invention by providing an electronic power control system in which the output power of the multiple heating elements of an electrically heated cooking surface, such as an electric range, is electronically controlled to provide a heating level for each element which corresponds to a power setting separately selected for each element by an operator from a plurality of discrete power level settings. Preferably, the heating elements themselves are characterized by a rapid thermal and electrical response typical of heating elements made from $MoSi_2$ or tungsten, and are used in conjunction with a glass ceramic cooking surface. A separate power setting input means, preferably a keyboard array, is provided for each heating element. In addition to the interaction of n-heating elements in a Steady State operating mode, the interaction of n-heating elements in two additional operating modes designated Soft Start and Instant On are provided for by this invention.

The heating elements are energized by power pulses comprising full-cycles of the AC power signal. Electronic switching is employed to individually control the power pulse repetition rate for each heating element. The control logic for each heating element provides a unique power pulse repetition rate for each power setting available for selection by an operator.

A digital control signal representing the power setting selected for each heating element is stored in a memory. During steady state operation, the power pulse repetition rate for each heating element is determined by the response of the control logic to the corresponding stored control signal.

Coordinated control of the power for each heating element is accomplished by a master timer circuit which insures that the control logic for each of n multiple heating elements is cycled through once every n power cycles. This staggering of the control logic processing for each heating element causes each heating element to be out of phase with every other heating element by at least one power cycle. Operation in this fashion minimizes the overlap of power pulses. Thus, in a preferred embodiment employing four heating elements for power pulse repetition rates of ¼ or lower, a power pulse is applied to, at most, one heating element during any one power cycle. Consequently, when all four heating elements are operating in the Steady State mode at a power setting requiring a pulse repetition rate of ¼, a power pulse will be applied to a different heating element each power cycle, rather than applying a power pulse to all four heating elements during one cycle and having all four stand idle for three cycles.

The Soft Start mode is initiated for a heating element whenever the power setting for that element is changed from an OFF power setting to any other power setting. When operating in the Soft Start mode the power pulse repetition rate is controlled independently of the actual power setting selected and stored in memory by substituting a predetermined power pulse repetition rate for the pulse repetiton rate associated with the actual power setting. This Soft Start pulse repetiton rate enables maximum current to be applied to the cold heating element without exceeding the current-carrying capacity of the power circuit as the resistance of the heating element changes from its relatively low value at room temperature to its relatively high value at operating temperature. The Soft Start monitoring means for n-heating elements inhibits the application of power to all other heating elements during any power cycle in which power is applied to a heating element operating in the Soft Start mode. Thus, excessive total peak current drawn by the system due to one or more heating elements operating in the transient Soft Start mode is avoided. After a predetermined time has elapsed, the control system terminates the Soft Start operating mode and initiates the Instant On operating mode.

The purpose of the Instant On operating mode is to provide a nearly immediate visual indication to the operator in the form of a glowing heating element that the heating element has been switched from OFF to some other power setting. In the Instant On mode, the repetition rate associated with the maximum power setting is substituted for the actual power setting for a predetermined period causing the heating element to glow brightly immediately following the termination of the Soft Start mode. The Instant On mode is terminated before any appreciable energy is transferred to the cooking surface so as to avoid overheating when the lowest power setting is selected. After a predetermined time has elapsed for the Instant On mode, the control system terminates the Instant On mode and power pulse repetition rate control reverts to the actual power setting selected, thereby initiating Steady State operation. Provision is also made to prematurely terminate the Instant On operating mode when during this mode the power setting is changed to a lower power setting.

In the preferred embodiment of this invention, a custom programmed microprocessor provides the control logic. However, an alternate embodiment is disclosed in which the control logic is implemented using discrete digital logic circuitry.

DESCRIPTION OF THE DRAWINGS

FIG. 8 shows the interrelationship between the various Routines of FIGS. 9–17.

FIGS. 9–17 are flow diagrams of the Power Up, Scan, Input Data, Compare, Power Control, Power Compare, Zero Cross-over, Power Out and Shift Routines, respectively.

DESCRIPTION OF THE INVENTION

I. Overview

Figure 1:
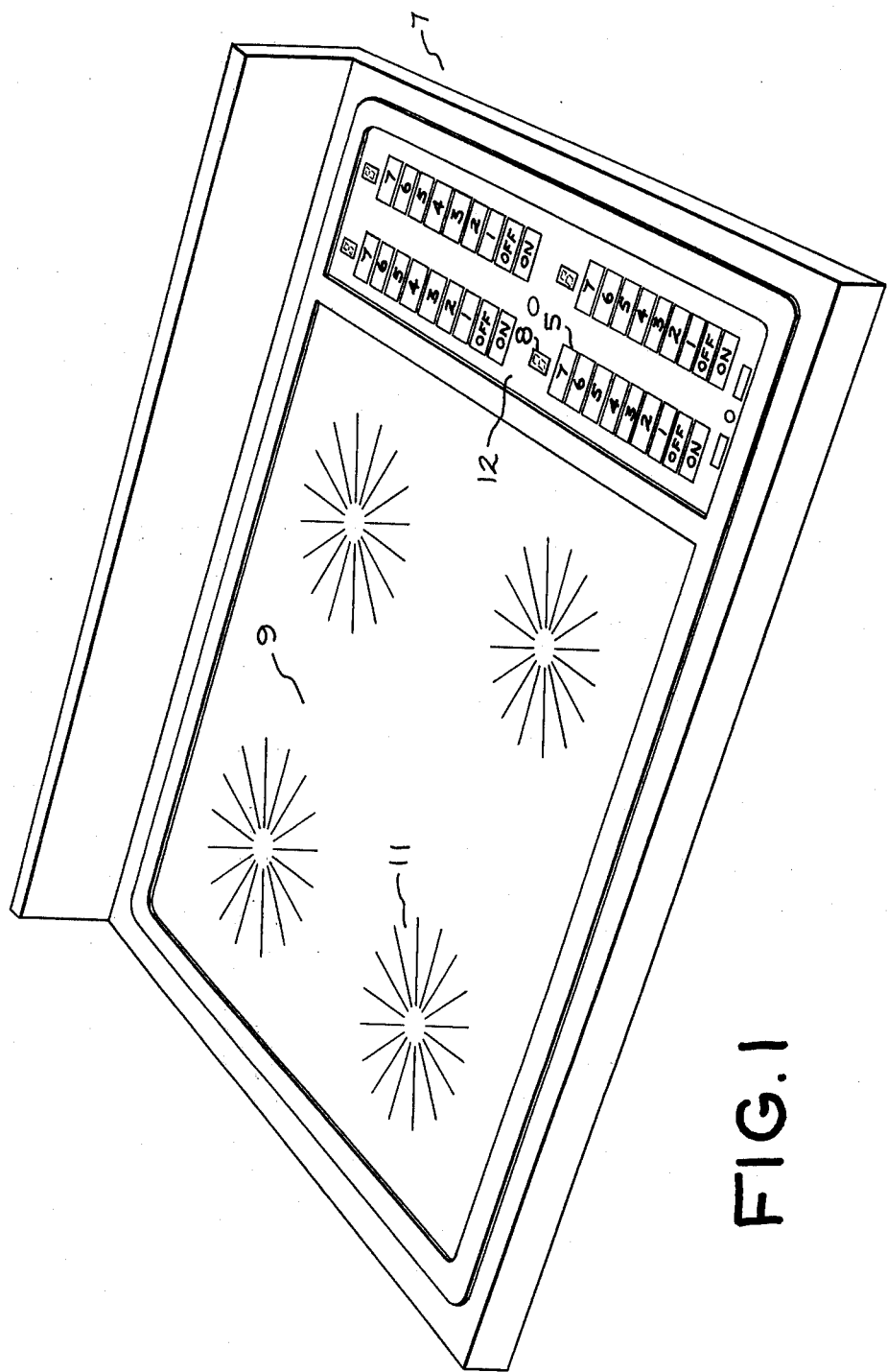
FIG. 1 is an illustration in perspective of the multiple element cooktop employing the invention.

This invention, broadly speaking, is directed to coordinated control of the output power of multiple resistive heating elements. More specifically, it is directed to a control system for controlling the cooking temperature of a glass ceramic cooktop or hotplate employing multiple resistive heating elements made of molybdenum disilicide ($MoSi_2$), tungsten or other material possessing similar dynamic thermal and electrical properties, by open loop control of the power output of each of the heating elements.

According to this invention, cooking temperature is controlled by controlling the pulse repetiton rate of power pulses applied to each heating element in accordance with a power setting selected separately for each heating element by an operator from a plurality of discrete power settings. A range of discrete power settings covering a useful range of cooking temperatures is provided, each setting having uniquely associated with it a particular power pulse repetition rate. The control of each heating element is interrelated with that of the other heating elements to the extent that each element operates out of phase with the other heating elements by an integral number of cycles.

The control system of this invention implements three operating modes, a Steady State mode, a Soft Start mode, and an Instant On mode. The Soft Start mode is employed when initially energizing a heating element which is at or near room temperature to avoid transiently overloading the current-carrying capability of the heating element power circuit. As previously mentioned, the resistance of a heating element made of $MoSi_2$ or tungsten is roughly a factor of ten lower at room temperature than at operating temperature. Thus, to avoid an initial inrush current overload, a predetermined power pulse repetition rate is implemented independent of the actual power setting when operating in this mode. As is well known to those skilled in the art, relatively high peak currents of short duration can be tolerated without blowing fuses or power semiconductors. Thus, the current overload problem is overcome by limiting the duration of the pulse and by adequately time spacing the pulses. However, it is also desirable to bring the heating element to operating temperatures rapidly to minimize the duration of this period of relatively low heating element resistance and the resulting high current peaks. Close time spacing of the power pulses brings the heating element to operating temperature more quickly. Accordingly, a pulse repetition rate which provides an optimum compromise between these competing considerations is desirable. A Soft Start pulse repetition rate described in greater detail hereinafter which provides a satisfactory compromise has been empirically determined.

As is apparent from the foregoing discussion, it is desirable to implement the Soft Start mode whenever a cool (room temperature) heating element is to be energized. Since this system employs no temperature sensors, some alternate manner of identifying a cool heating element is needed. It will be recalled that heating elements of MoSi$_2$ or tungsten heat and cool very rapidly. As a practical matter, when an OFF power setting is selected by a human operator, the heating element cools so rapidly that it will cool down to room temperature (the heating element—not the glass cooktop) before the human operator can physically select another setting. Thus the presence of an OFF power setting provides a satisfactory indication that the heating element is at room temperature. Accordingly, the Soft Start mode is implemented whenever the control system of this invention detects a change in power setting from an OFF setting to any other power setting.

Although the pulse repetition rate employed in this mode maintains the current drawn by the individual heating element within acceptable limits during the transient heating up period, it is possible when the other heating elements are operating, particularly if operating at the higher power settings, that the addition of the transient current peaks for the heating element operating in the Soft Start mode when added to the current drawn by the other heating elements may cause the total current either instantaneous or average drawn by the system to exceed acceptable limits. Thus, provision is made in this invention to inhibit the application of power to all other heating elements during a power cycle in which a power pulse is applied to a heating element operating in the Soft Start mode.

The Instant On mode is employed to make advantageous use of the fact that heating elements made of MoSi$_2$ or tungsten, when energized at full power, glow brightly nearly instantaneously. In the Instant On mode, the maximum power pulse repetition rate is temporarily substituted for the pulse repetition rate corresponding to the actual power setting to cause the heating element to glow with sufficient intensity to be visually perceivable to an operator through the cooking surface. This mode is implemented immediately following the Soft Start mode to provide the operator with a visual indication that the heating element has been turned on. Although the heating element itself glows visibly at even the lowest power setting employed in this system, the optical properties of the glass ceramic cooking surface conventionally used serves to filter or attenuate the visible radiation at the lower power settings to the extent that at the lower settings the glow is not readily perceivable to the operator through the cooking surface.

In practice the duration of the Soft Start mode is so short that the delay between the selection of a power setting by the operator and the appearance of the glow is barely noticeable. To the operator the heating element appears to glow almost immediately following a change in power setting from OFF to some other power setting. After a predetermined period of somewhat arbitrary duration (approximately 8½ seconds has been employed satisfactorily), this mode is automatically terminated, the duration of this period being subject only to the obvious limitation that prolonged application of full power to the heating element may raise the temperature of the relatively slow responding glass ceramic cooking surface to a temperature which exceeds the temperature corresponding to the power setting selected by the operator.

Provision is also made to immediately terminate the Instant On operating mode in the event the power setting is changed to a lower setting prior to the expiration of the time allocated for this operating mode.

The Steady State mode, as the name implies, follows these initial transient modes. During Steady State operation, the repetition rate associated with the actual power setting selected by the operator is implemented. The system operates in this Steady State mode at all times except during the brief period following the change in power setting from OFF to some other power setting. A change in power setting from one non-Off setting to another non-OFF setting results in a change to the repetition rate corresponding to the newly selected power setting, with no temporary substitution for this repetition rate being implemented.

As previously described, each heating element has associated with it its own array of keys for power selections 1-7. Thus, the power setting for any heating element may be independently selected by the operator. However, processing of the input data from the operator actuated keyboard to the control logic is coordinated such that control of each heating element is at least one, and at most three, power cycles out of phase with each of the other three heating elements. This effectively spreads or staggers the current peaks for the total current drawn by the system over a four cycle control period, thereby reducing the total peak current drawn by the system during any one cycle.

In the description which follows, frequent reference will be made to the drawings wherein identical reference numerals denote similar or corresponding elements throughout.

FIG. 1 illustrates the cooktop, control panel and display portions of an electric range, generally designated 7, having a substantially horizontal glass ceramic cooktop 9. Radial patterns 11, identify the relative lateral positions of each of four surface heating elements (not shown) located directly underneath cooktop 9. The control and display panel generally designated 12 includes a complete set of capacitive touch control keys 5 and a seven segment digital LED display element 8 for each heating element.

Figure 2:
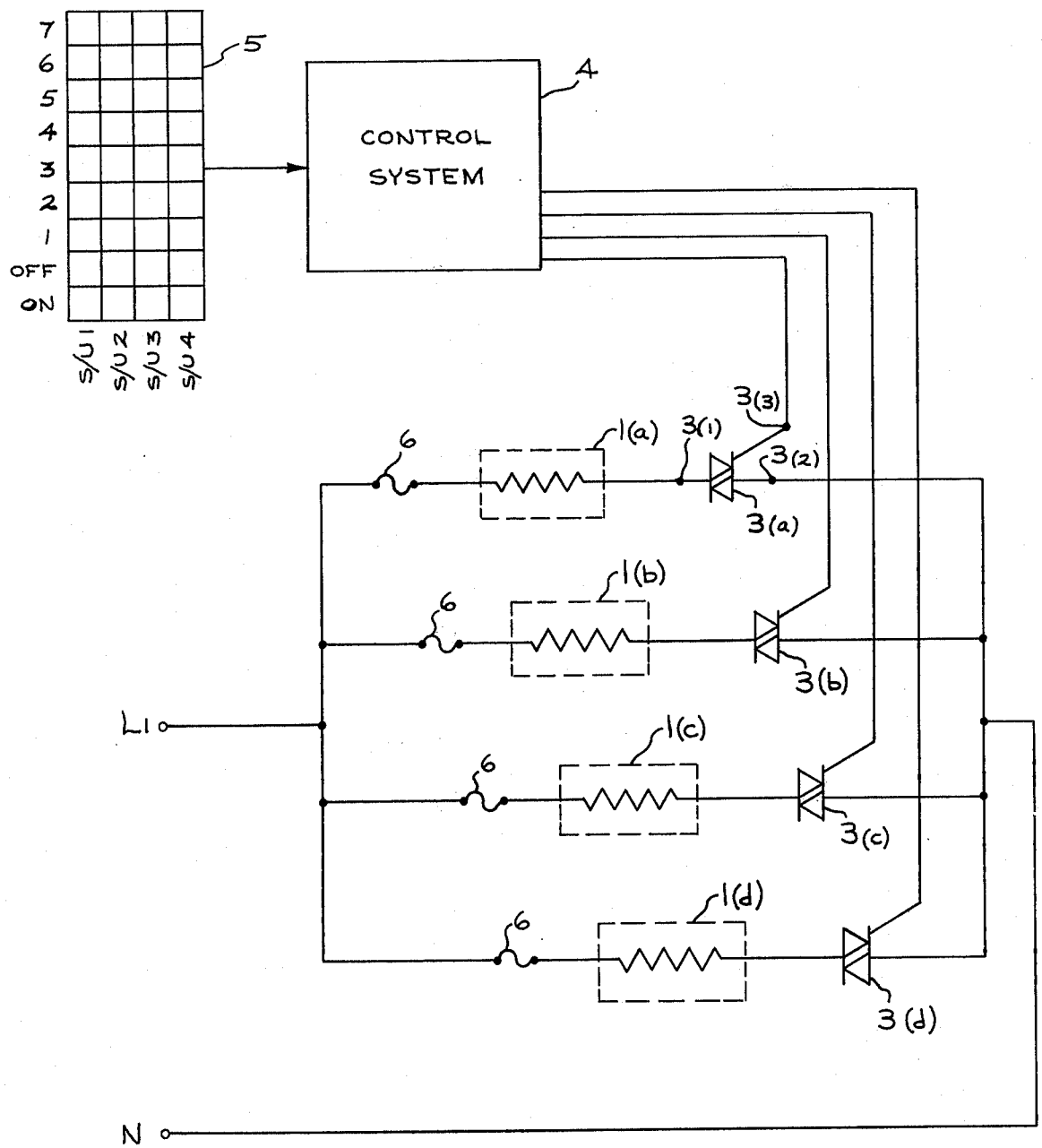
FIG. 2 is a generalized block diagram of a cooking arrangement employing the invention.

FIG. 2 illustrates schematically the system to be controlled in accordance with the present invention. Each of four resistive heating elements 1(a)-1(d), preferably constructed of MoSi$_2$ or tungsten, is coupled to standard 120 volt, 60 Hz AC power source via power lines L1 and N through one of triacs 3(a)-3(d), respectively, and a current limiting circuit breaker 6, the heating circuits being connected in parallel arrangement with each other. Triacs 3(a)-3(d) are conventional thyristors, capable of conducting current in either direction irrespective of the voltage polarity across their main terminals 3(1) and 3(2), when triggered by either a positive or a negative voltage applied to the gate terminals 3(3). Circuit breakers 6 are of the type conventionally employed to protect the wiring from excessive current. Each breaker 6, as is typical of such devices, will open the circuit when the average current exceeds the rated value over a finite period of time, but will allow current pulses of higher peak values when of very short duration and spaced sufficiently in time to limit the average current to less than that required to trigger the circuit breaker. Control system 4 controls the power applied to heating elements 1(a)-1(d), by controlling the rate at which gate pulses are applied to gate terminals 3(3) in accordance with power setting selections for each heating element entered by an operator via keyboard 5. The columns of keys designated S/U1-S/U4 provide the control inputs for heating elements 1(a)-1(d), respectively.

In the embodiments hereinafter described as examples illustrative of the inventive concept, the power pulses applied to the heating element are full cycles of a 120 volt, 60 Hz AC power signal. However, power signals of different frequencies and voltage levels could be similarly used. Also, half power cycles could be utilized as disclosed in the aforementioned co-pending applications.

As indicated previously, a plurality of discrete power settings are provided each having uniquely associated with it a particular power pulse repetition rate. In a preferred embodiment, nine power settings including OFF and ON power settings are provided for each heating element 1. Table I shows the pulse repetition rate and heating element output power, expressed as a percentage of total power, associated with each power setting.

TABLE I

| Power Setting | Power Pulse Repetition Rate | Output Power % | Control Signal Code | | | |
|---|---|---|---|---|---|---|
| | | | $Y_1$ | $Y_2$ | $Y_3$ | $Y_4$ |
| 1 (n = 4) | 1/64 | 4 | 0 | 0 | 0 | 1 |
| 2 (n = 3) | 1/32 | 8 | 0 | 0 | 1 | 0 |
| 3 (n = 2) | 1/16 | 13 | 0 | 0 | 1 | 1 |
| 4 (n = 1) | ⅛ | 22 | 0 | 1 | 0 | 0 |
| 5 | ¼ | 35 | 0 | 1 | 0 | 1 |
| 6 | ½ | 60 | 0 | 1 | 1 | 0 |
| 7 | 1/1 | 100 | 0 | 1 | 1 | 1 |
| OFF | — | — | 1 | 0 | 0 | 0 |
| ON | — | — | 1 | 0 | 0 | 1 |

Figure 3:
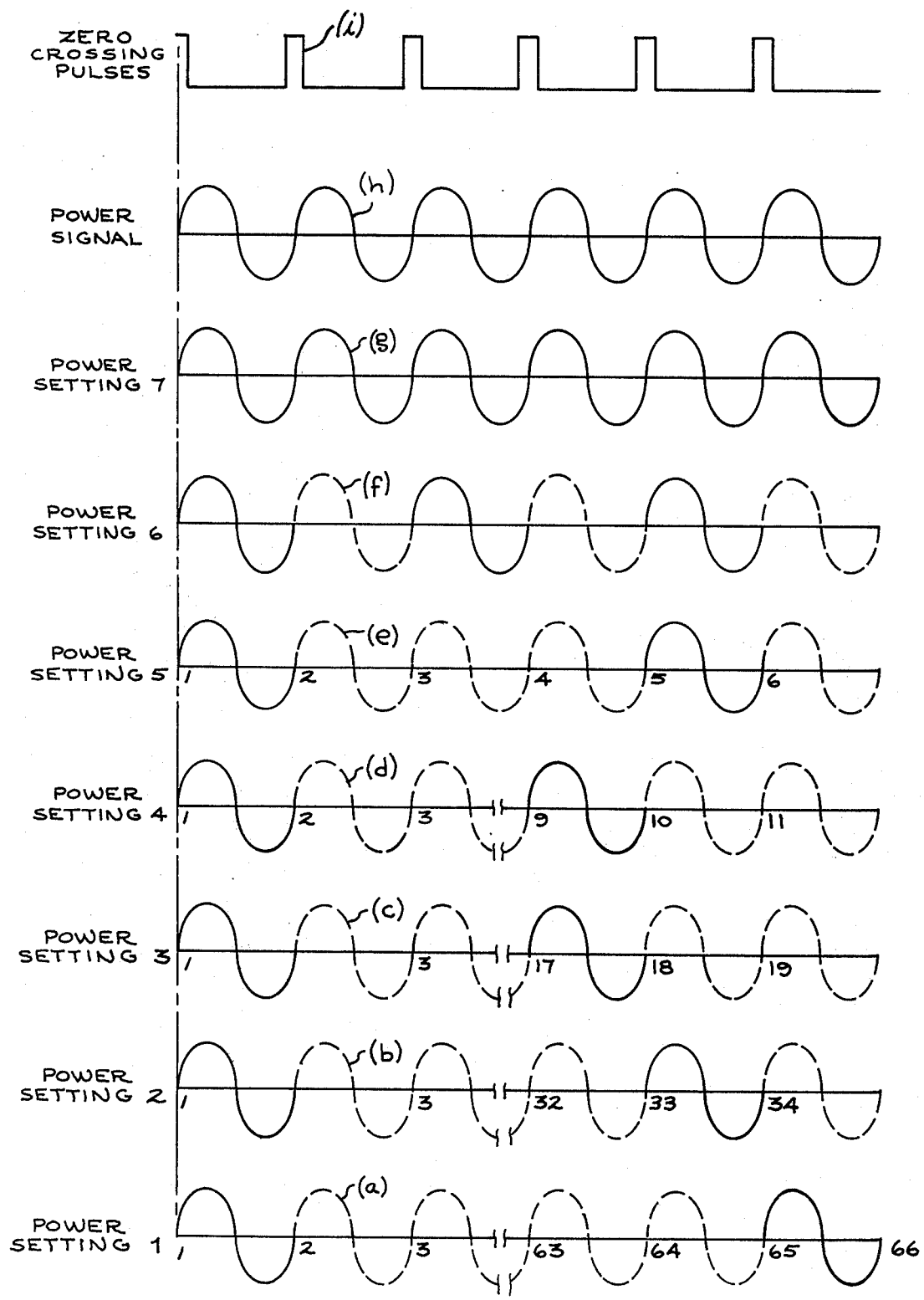
FIG. 3 illustrates the power signals corresponding to various operator selectable power settings.

In FIG. 3, the waveforms (a)-(g) represent the voltage applied to heating element 1 for each of power settings 1-7, respectively. Waveform (h) represents the total available voltage. The power pulses are represented by full lines, those cycles of the power signal during which the triac is non-conductive, are shown in phantom.

As shown in Table I and FIG. 3, the pulse repetition rates vary from a pulse repetition rate of 1/64, that is one power pulse per 64 power cycles for power setting 1, the lowest non-OFF power setting, to a rate of 1/1, one power pulse every cycle for setting 7, the maximum power setting. As an example, selection of power setting 3 for one of heating elements 1 results in voltage signal (c) of FIG. 3 corresponding to a repetition rate of 1/16 being applied to the selected heating element.

Figure 4:
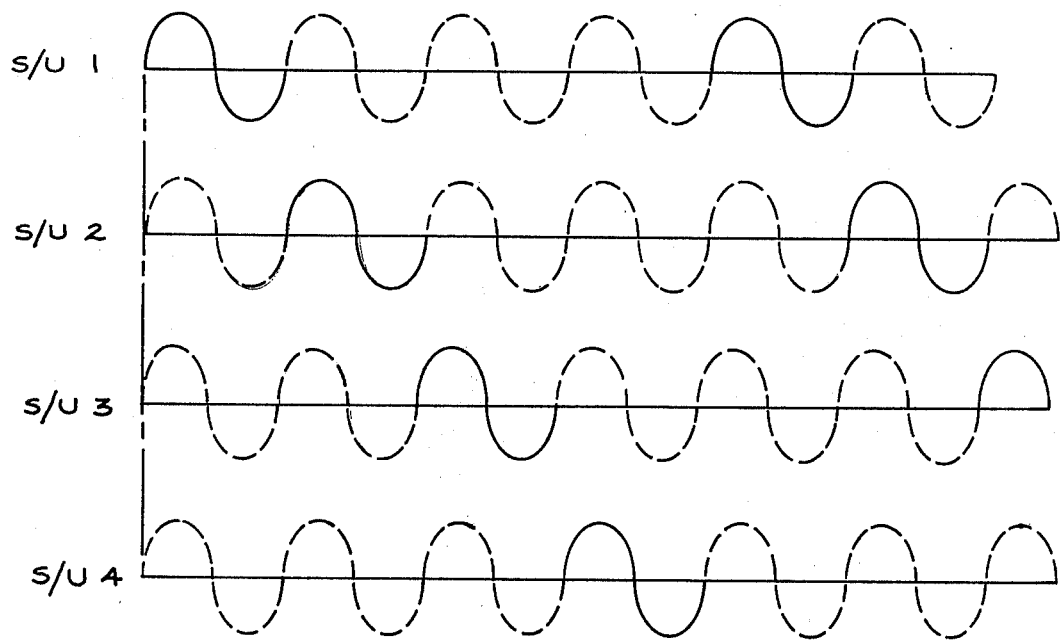
FIG. 4 illustrates the staggered manner in which power signals for a particular power setting are applied to each of four heating elements operating at power setting 5.

FIG. 4 illustrates the waveform of the voltage applied to the four heating elements when all four elements are operating in the Steady State Mode at power setting 5 which requires a power pulse repetition rate of ¼. It is apparent from this illustration that each heating element is at least one power cycle out of phase with every other heating element. Consequently, although all four elements are ON, the maximum total peak current drawn by the system equal the peak current drawn by a single heating element. Without this staggered operating feature, it is possible that the maximum peak current would be four times this value, such as would occur if the power pulse were being applied to all four heating elements during the same cycle. In addition to the high peak current which would result, this peak would be followed by three cycles in which the heating elements would be idle. This could result in an undesirable observable flicker in household lighting, a phenomenon which could be even more pronounced at lower power settings due to the lower repetition rate of the power pulses.

The coordinated control which provides this "staggering" feature is achieved by sequentially cycling through the control logic for only one heating element each cycle, and consequently cycling through the control logic for any particular heating element once every four cycles.

In implementing the various repetition rates, control system 4 makes a control decision for only one of the four heating elements 1(a)-1(d) each power cycle, hereinafter referred to as a control interval. Consequently, a control decision is made for any one particular heating element once every four control intervals. This four control interval period is hereinafter referred to as a control period. Proper implementation of the pulse repetition rates requires that a trigger decision, that is a decision to apply or not apply a power pulse to each of heating elements 1(a)-1(d), be made at the inception of each control interval. This is accomplished by a control decision which is characterized as a 4-bit digital control word, in which the state of each bit represents a decision to apply or not apply power to its associated heating element. By sequentially testing a different bit of this control word during each control interval in the control period, a trigger decision is obtained for each control interval. The control decision is thus in effect four trigger decisions made simultaneously or in parallel once every four control intervals but carried sequentially or serially as one trigger decision every control interval. One bit of each of the control words is evaluated for each heating element during each control interval. A decision to apply a power pulse to a particular heating element is carried out by applying a trigger pulse to gate 3(l) of the associated one of triacs 3(a)-3(d). When the decision is not to apply a power pulse, the associated triac is not triggered and thus is non-conductive during the next control interval.

The triggering of triacs 3(a)-3(d) is synchronized with the positive going zero crossings of the power signal, as is common practice, to enhance triac reliability and to minimize electromagnetic interference resulting from switching transients.

II. Functional Description

Figure 5A:
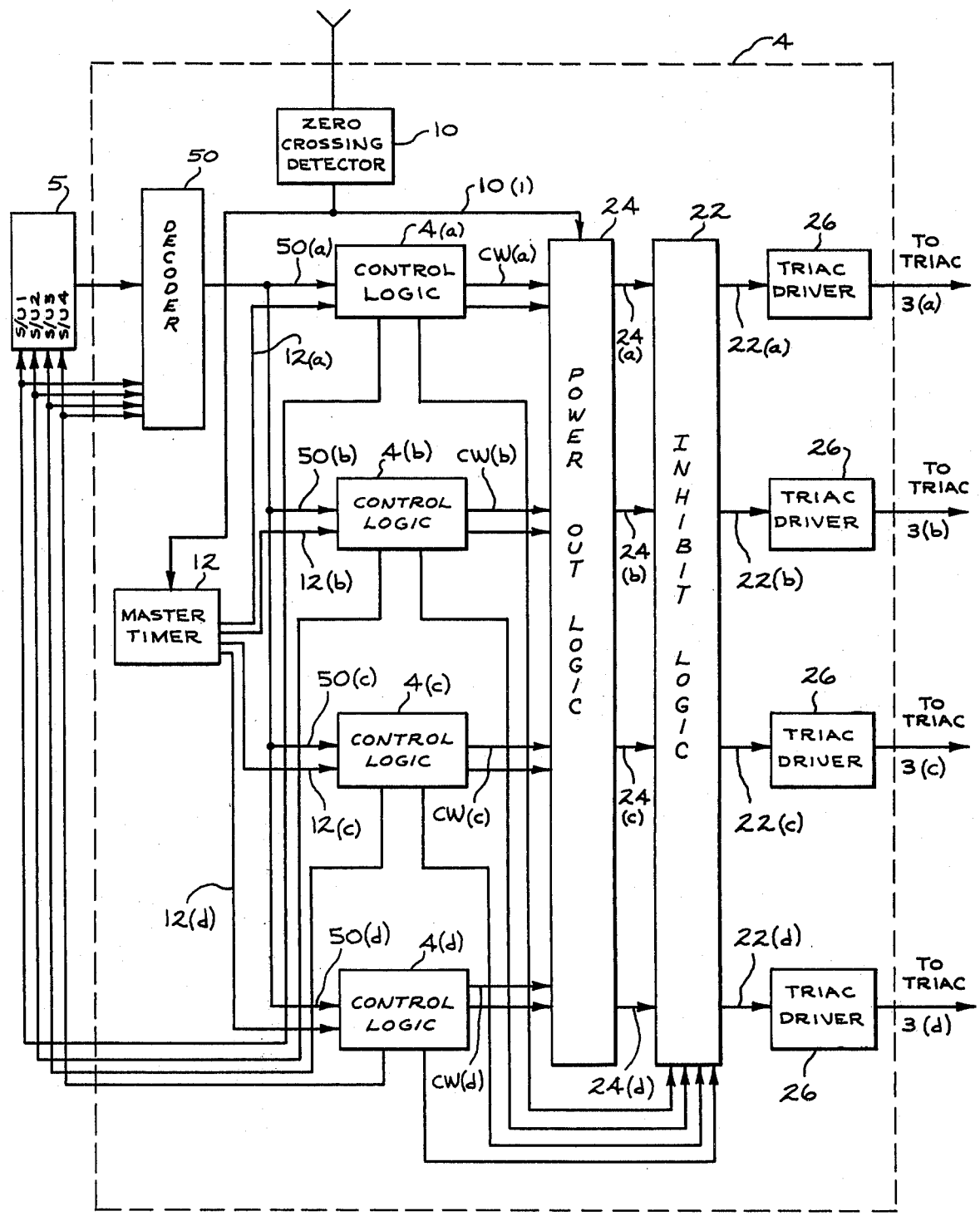
FIG. 5A is a functional block diagram of the control system of the invention.

Referring to FIG. 5A, control system 4 includes four identical control logic networks 4(a)-4(d), each of which generates control words in response to the operator input via keyboard 5. Each of control logic networks 4(a)-4(d) is uniquely associated with one column of keys of keyboard 5 and one of triacs 3(a)-3(d); that is, control logic blocks 4(a)-4(d) generate control words for controlling the power pulse repetition rate for heating elements 1(a)-1(d) (FIG. 2), respectively, in response to operator selected power settings input at key columns S/U1-S/U4 of keyboard 5 (FIG. 2), respectively.

As previously mentioned, according to this invention a 4-bit control word for a particular heating element is generated once every four control intervals, the four control interval period being designated a control period.

Power out logic 24 stores each of said control words in a separate storage register. The bits of the control word are sequentially tested from the MSB to the LSB, with one bit of each word, a total of four bits, being tested at the inception of each control interval. The state of the tested bit determines whether power is to be applied to its corresponding heating element during that control interval.

A particular one of control logic blocks 4(a)-4(d) is cycled through during one of every four control intervals, whereas the power out logic 24 which stores the control words generated by logic blocks 4(a)-4(d) is cycled through once every control interval.

This timing is synchronized by zero crossing detector 10 and Master Timer 12. Zero crossing detector 10 is a conventional circuit known in the art which monitors the 60 Hz AC power signal and generates a zero crossing pulse with each detected positive going zero crossing of the power signal, resulting in the generation of a zero crossing pulse at the beginning of each power cycle, as illustrated at (i) of FIG. 3. These pulses are provided to power out logic network 24 and Master Timer 12. At power out logic network 24 the zero-crossing pulse, functionally speaking, strobes the state of the test bits through to the output terminals of the network.

Master Timer 12 functions as a 2-bit ring counter having four output lines 12(a)-12(d), one of which corresponds to each count. Master Timer 12 counts zero crossing pulses from detector 10 and provides an enabling pulse on that output line which corresponds to the current count. Thus, an enabling pulse will be provided in succession at each output once every four zero crossings. Output lines 12(a)-12(d) are coupled to control logic networks 4(a)-4(d), respectively. The appearance of an enabling signal at the input of one of said control logic networks initiates the logic cycle which generates a control word. In this fashion, Master Timer 12 sequentially enables control logic networks 4(a)-4(d), one logic network being enabled at the inception of each control interval in response to zero crossing pulses from detector 10.

Each one of control logic networks 4(a)-4(d) provides a keyboard scan output and a Soft Start output, in addition to the control word output. The keyboard scan output is provided to the column of keys of keyboard 5 associated with the particular logic network to determine if an operator input is being entered via that column. In this fashion, each column is scanned during the control interval in which its corresponding control logic network is enabled. Consequently, each column is scanned once per control period, i.e. once every four conrol intervals. The output from keyboard 5 provides scan information to decoder 50. Decoder 50 converts the input from the keyboard to a binary coded decimal (BCD) signal and provides this decoded signal to the inputs of all four control logic networks 4(a)-4(d). However, this input is acted upon only by one control logic network during one control interval, namely the logic network enabled by Master Timer 12 during that particular control interval.

The Soft Start output from each of associated logic networks 4(a)-4(d) is provided to inhibit logic network 22. The state of this output indicates whether its associated heating element is operating in the Soft Start mode. When none of the heating elements are being operated in the Soft Start mode, the output of power out logic network 24 for each heating element passes unchanged through inhibit logic network 22 to the appropriate triacs 3(a)-3(d) via triac driver circuits 26. However, in the event one or more heating elements are operating in the Soft Start mode, inhibit logic network 22 inhibits the triggering of all other triacs 3 during the control interval in which the triac associated with the heating element operating in the Soft Start mode is triggered into conduction.

Figure 6:
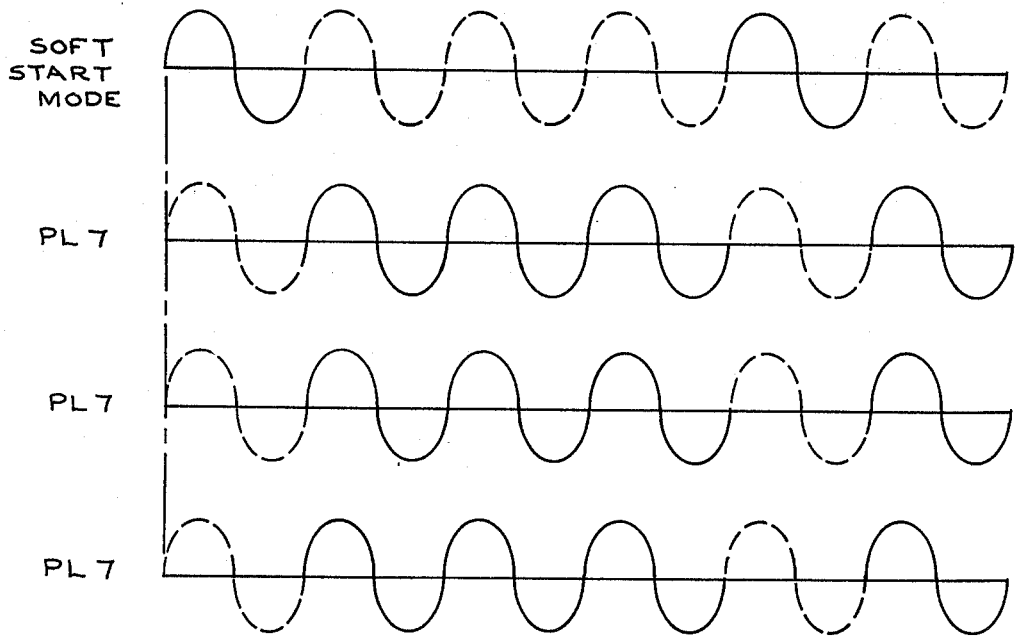
FIG. 6 illustrates the power signals applied to each of four elements when one is operating in the Soft Start Mode and three are operating at power level 7.

FIG. 6 shows the voltage waveforms for all four heating elements when one element is operating in the Soft Start Mode and the remaining three elements are operating in the Steady State Mode at power setting 7. This Figure shows that power to the three elements operating in the Steady State Mode is inhibited during the cycle in which power is applied to the element operating in the Soft Start Mode.

Figure 5B:
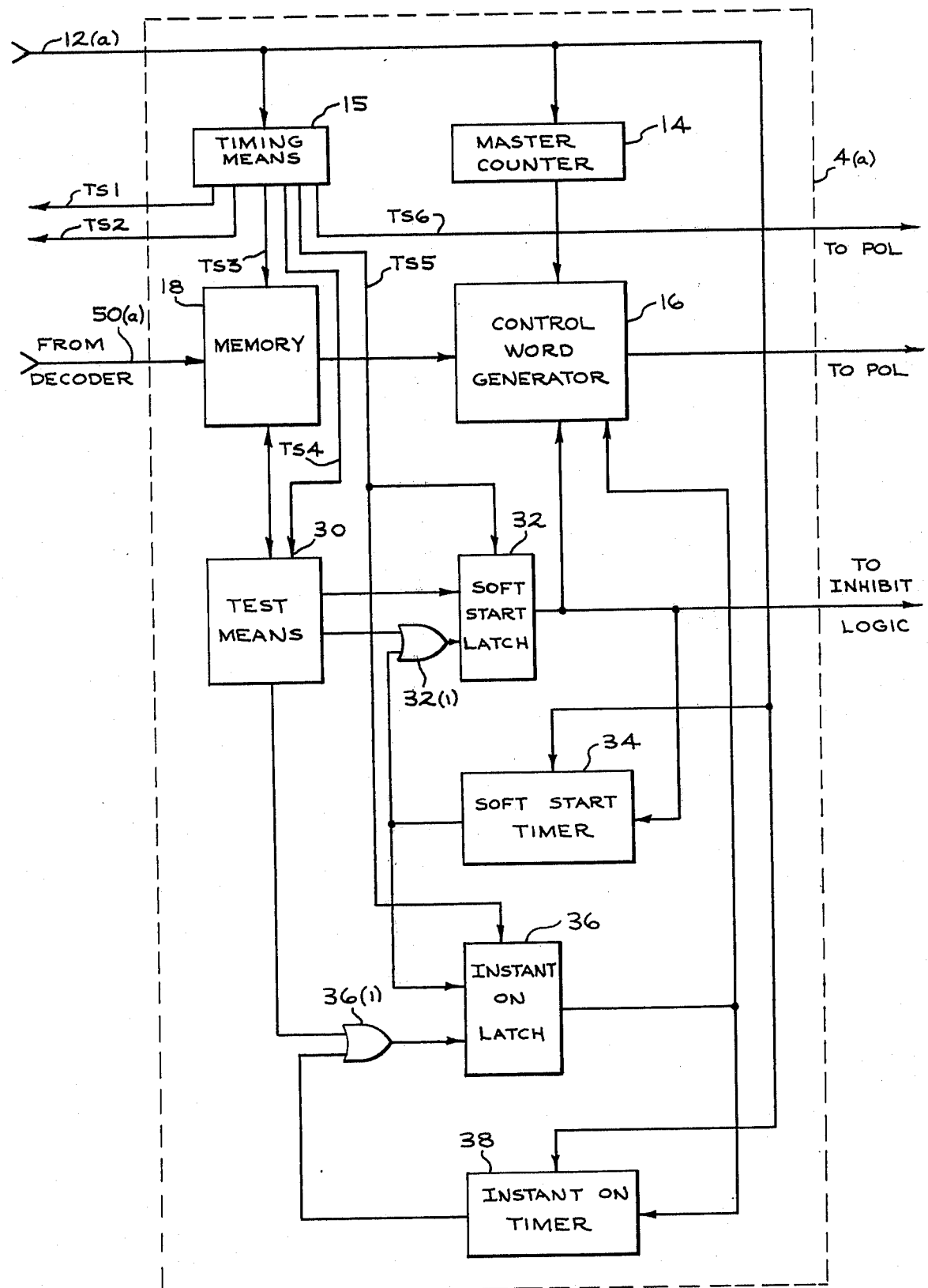
FIG. 5B is an expanded functional block diagram of one of the control logic blocks of the diagram of FIG. 5A.

FIG. 5B illustrates in greater detail control logic network 4(a), representative of control logic networks 4(a)-4(d). Timing signals for synchronizing cycling through control logic network 4(a) is provided by timing means 15. A first timing pulse is supplied to decoder 50 to clear the decoder and prepare it to receive the next input from keyboard 5. Next, a scanning pulse generated by timing means 15 is applied to column S/U1 of Keyboard 5, the column associated with control logic network 4(a). This scan pulse causes this output of keyboard 5 to reflect the state of the keys in that column. If any key is actuated, the keyboard output will identify the power setting selected; if no key is actuated, the keyboard output will indicate a blank input. Decoder 50 decodes the output from keyboard 5 to a binary coded decimal (BCD) signal which is transmitted to memory 18. Memory 18 includes a temporary storage location KB (not shown) and a permanent storage location PM (not shown) for storing control signal data. The newly-entered digital control signal from decoder 50 is initially stored in a temporary location designated KB which is enabled by a timing signal from timing means 15. After test means 30 tests this signal in a manner to be described, the signal stored at KB may be transferred (depending on the controls as explained below) to permanent storage location PM in memory 18 where it is retained indefinitely until replaced by a control signal representing a subsequently selected power setting.

Test means 30 monitors inputs stored at KB to determine whether the input represents a blank, i.e. no new input, an OFF setting, an ON setting, or one of power settings 1-7. When a blank is identified, the contents of PM are undisturbed, and the control logic proceeds in accordance with the previously entered setting stored at PM.

When a new input is identified by test means 30 as an OFF setting, the signal is read into PM replacing the previously entered setting.

When either an ON setting or one of settings 1-7 is identified however, additional testing is performed on the contents of PM before reading the contents of KB into PM, to determine whether a transient mode must be initiated or terminated. This additional testing is described in relation to the Soft Start and Instant On Modes.

During the first control interval of its control period, control word generator 16 generates one of the 4-bit words listed in TABLE II. The power pulse repetition rates for power settings 5, 6 and 7 can be implemented by repetitively generating one of these control words; power settings 1, 2, 3 and 4 can be implemented by repetitively generating the proper sequence of words (1000) and (0000).

TABLE II

| Control Words | | | |
|---|---|---|---|
| 0 | 0 | 0 | 0 |
| 1 | 0 | 0 | 0 |
| 1 | 0 | 1 | 0 |
| 1 | 1 | 1 | 1 |

It will be recalled that one bit per word is tested each control period. For this set of control words, the test bit in the logical one state results in a decision to trigger the triac; if in the logical zero state, a decision not to trigger results. The sequential testing of the bits is accomplished beginning with the most significant bit.

It is apparent that power settings OFF and 5-7 can be implemented by generating one of control words (0000), (1000), (1010) and (1111), respectively, each control period, resulting in power pulse repetition rates of 0, $\frac{1}{4}$, $\frac{1}{2}$ and 1/1, respectively.

Power settings 1-4 require the proper repetitive sequencing of control words (1000) and (0000). More specifically, power setting 4 requires a repetitive sequence of word (1000) followed by one consecutive (0000) word; setting 3 requires repetition of a sequence comprising word (1000) followed by 3 consecutive (0000)s; setting 2 requires repetition of a sequence comprising word (1000) followed by 7 consecutive (0000)s and setting 1 requires a repetition of a sequence comprising word (1000) followed by 15 consecutive (0000)s. Thus, for power setting 4, word (1000) is generated every other control period; for power setting 3, word (1000) is generated every 4th control period; for power setting 2 (1000) is generated every 8th control period, and for power setting 1, (1000) is generated every 16th control period. Stated more concisely, control word (1000) is generated every $2^n$ control periods where n equals 1-4 for power settings 4-1 respectively (TABLE I). In forming the proper sequences of (1000)s and (0000)s, use is made of a binary counter where an identical state of the first least n significant bits of the count will recur every $2^n$ counts. For example, at least the first significant bit of the count will be zero every $2^1$ or 2 counts, at least the first 2 least significant bits will be zero every $2^2$ or 4 counts, and so on.

Zero crossing master counter 14 is a ring counter arranged to repetitively count a predetermined number of enabling pulses from Master Timer 12 and reset. The instantaneous contents representing the current count of counter 14 is designated ZCM. For power settings, 1-4, control word generating means 16 implements the desired repetitive sequences of words (1000) and (0000) by performing a logical comparison on the first n least significant bits of the count of counter 14, where n equals 1-4 for power settings 4-1, respectively (TABLE I).

When the first n least significant bits are all found to be in the logical zero state, control word generating means 16 generates word (1000), and when these bits are not all logically zero, word (0000) is generated. For example, for power setting 3, n=2, therefore word generating means 16 generates control word (1000) upon each recurrence of the count in which at least the first two least significant bits are logical zeros, which occurs once every four counts. Since counter 14 counts enabling pulses, the word generating means in this example generates word (1000) every 4th control period, thereby providing a sequence of control words in which a logical one bit occurs once in every four words or 16 bits, resulting in the desired power pulse repetition rate of 1/16.

Thus far, Steady State operation has been functionally described. It remains to describe the functional implementations of the Soft Start and Instant On mode.

The transient modes designated Soft Start and Instant On are initiated by test means 30. It will be recalled that these transient modes are implemented when the power setting is changed from OFF to ON to a power setting. It should be noted that the operator, when changing from an OFF setting to some other power setting, must select the ON setting and then select the desired one of power settings 1-7.

As previously described, test means 30 monitors the new scan results stored at KB. When an ON input is detected at KB, test means 30 tests the signal stored at PM to determine if the control signal currently being implemented represents an OFF setting, indicating that the setting is being changed from OFF to some other setting. If the signal stored at PM does not represent an OFF setting, indicating that the setting is not changing from an OFF setting, the ON input is ignored and the contents of PM are undisturbed. If PM contains a signal representing an OFF setting, the first step in implementing the Soft Start mode is accomplished by reading the ON signal stored at KB into PM. The second step occurs when a signal representing the selected one of settings 1-7 is entered at KB. Test means 30, upon detecting a signal representing one of settings 1-7, tests the contents of PM for a signal representing an ON signal. When the ON signal is detected, test means 30 provides a set signal to Soft Start Latch (SSL) 32, thereby completing the initiation of the Soft Start mode. The contents of KB are then read into PM. However, as long as SSL remains set, control word generating means 16 generates the control word which characterizes the Soft Start mode, regardless of the contents of PM. In a preferred embodiment, this pattern is identical to the code for power setting 5. Consequently, during the Soft Start mode, the power pulse repetition rate is the one associated with power setting 5; namely, one power pulse per four control intervals. It has been empirically determined that this power pulse repetition rate is an optimum rate which can be applied to a cold $MoSi_2$ heating element without exceeding the current surge capability of the power circuit and also enables the heating element to rapidly attain its steady state resistance value.

Soft Start Timer (SST) 34 is enabled by the setting of SSL 32. SST 34 controls the duration of the Soft Start operating mode by counting a predetermined number of enabling pulses from master timer 12. When this predetermined count is reached, SST 34 generates an output signal which resets both SST 34 and SSL 32, thereby terminating the Soft Start mode, and sets Instant On Latch (IOL) 36, thereby initiating the Instant On mode. IOL 36, when set, enables control word generating means 16 to implement the maximum power setting independently of the actual power setting selected. IOL 36 also enables Instant On Timer IOT 38. IOT 38 determines the duration of the Instant On mode by counting a predetermined number of enabling pulses from master timer 12 and then generating a reset signal which resets both IOT 38 and IOL 36, thereby ending the Instant On mode. The Steady State operating mode then proceeds as previously described.

It will be recalled that the Instant On mode is to be terminated in the event a change in power setting from higher to lower occurs while the Instant On mode of operation is in progress. Test means 30 performs this function as follows. In the event a signal representing one of settings 1–7 is detected at KB, the contents of PM are tested for a power level setting. When PM contains a signal representing a power level setting, indicating that the new input represents a change in power setting from one to another of settings 1–7, then a magnitude comparison is performed between the contents of KB and PM. When the magnitude of the signal at KB is less than that at PM, indicating that the new setting is lower than the previous setting, test means 30 provides a reset signal to Instant On Latch 36 and Instant On Timer 38, thereby terminating the Instant On operating mode. The signal at KB is read into PM and Steady State operation implementing the newly-entered power setting proceeds.

Whenever an OFF is received at KB, all latches and timers are reset immediately, terminating the Soft Start mode and Instant On mode.

III. Microprocessor Embodiment

Figure 7:
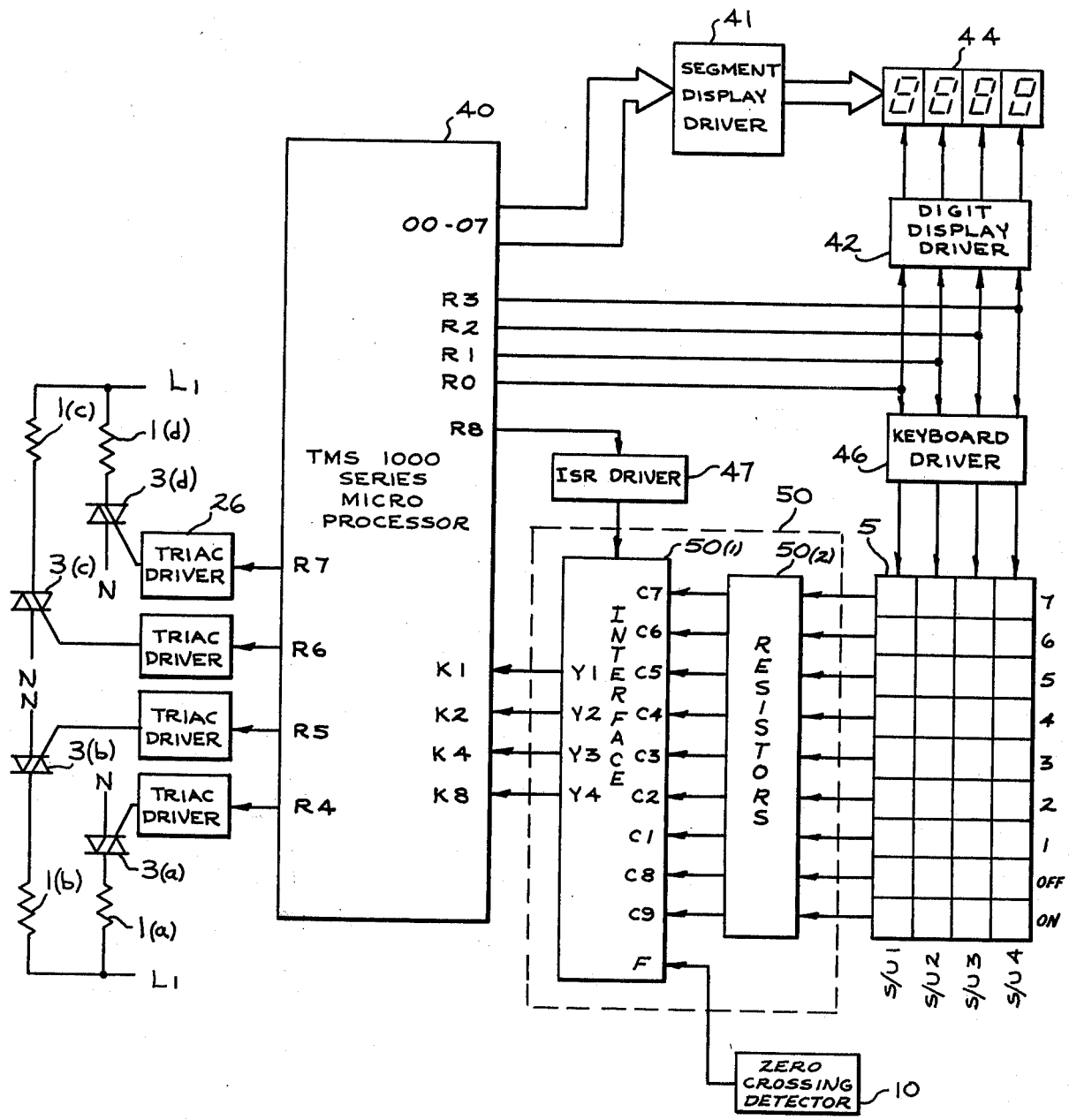
FIG. 7 is a block diagram of the microprocessor based embodiment of the invention.
Figure 10:
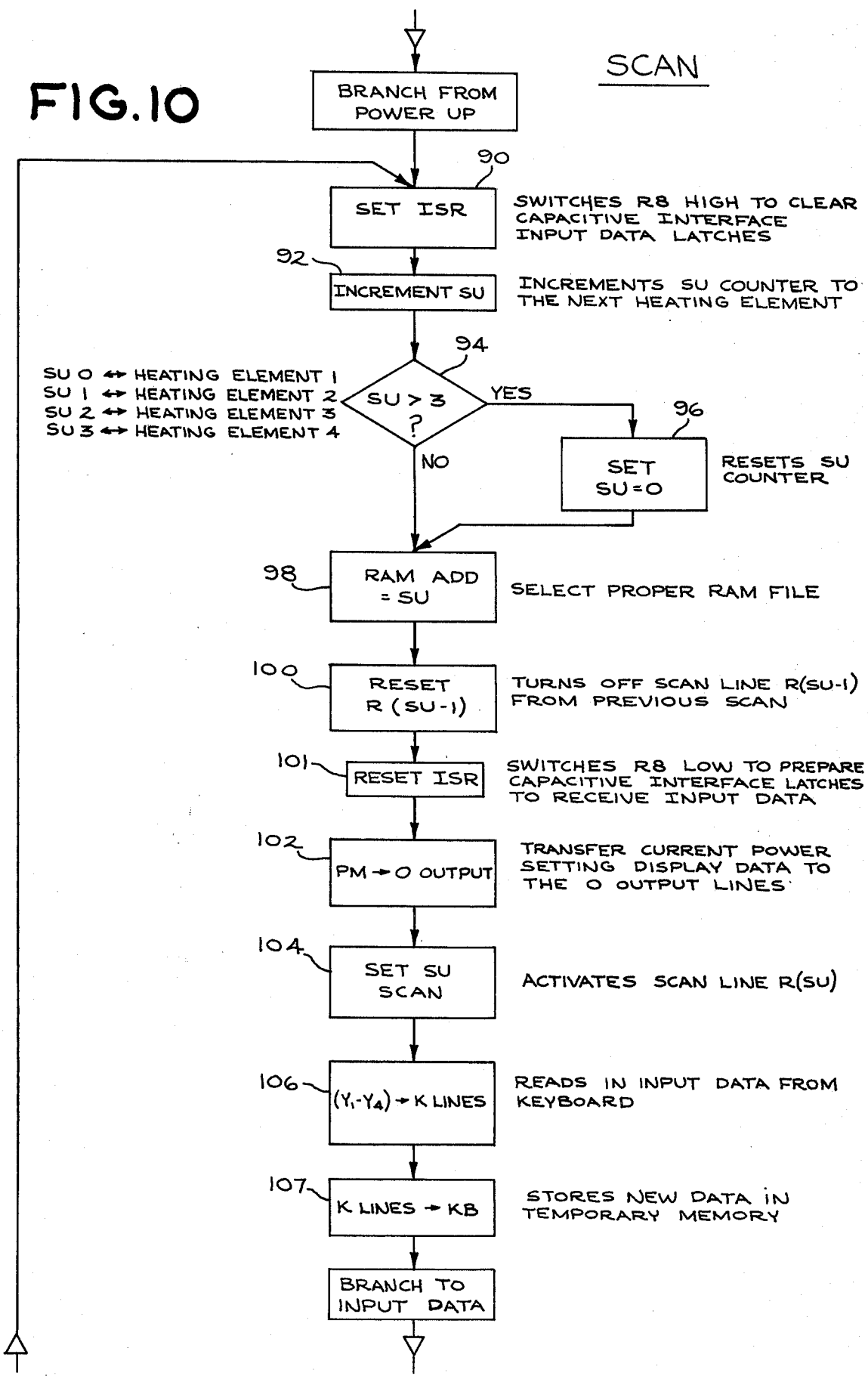

FIG. 7 schematically illustrates a preferred embodiment of a control circuit for the electric range of FIG. 1 having a glass ceramic cooktop and employing four $MoSi_2$ heating elements in which power control is provided electronically by a TMS 1000 series microprocessor or chip. The TMS 1000 series chip is commercially available from Texas Instruments, Inc., and others. Technical details of the chip are available in a Texas Instruments, Inc. publication entitled "TMS 1000 Series Data Manual," published December 1975.

Referring to FIG. 7, chip 40 is a TMS 1000 series microprocessor chip which has been customized by permanently configuring its read only memory (ROM) to implement the control scheme of the present invention.

Keyboard 5 is a capacitive touch array comprising four columns of 9 keys each. Columns for controlling heating elements (a)–(d) are designated S/U1–S/U4, respectively. The keys enable an operator to select power levels 1–7 in addition to ON and OFF for each of four heating elements. Keyboard 5 operates in the manner of conventional capacitive touch keyboards which is well known in the art and is described here only to the extent necessary to understand how the inputs to the control system are generated. Each key of keyboard 5 includes a top pad and two bottom pads. A dielectric material separates the top and bottom pads thereby effectively forming two capacitors in series. The top pad forms a common plate, for each of the two bottom plates. The one bottom pad for each key is connected to an input line which is common to all keys in the column. The other bottom pad has an output line shared by all the keys in the row. Thus the keyborad has one input line for each column commonly shared by all keys in that column, and 9 output lines, one for each row of keys. Each particular column of the keyboard is scanned by periodically applying a scan voltage to the input line for that column. This voltage is transmitted essentially unchanged to the output lines of all untouched keys. The output of a touched key will differ, having been dampened by the added capacitance resulting from the contact of the human operator with the top pad.

In the circuit of FIG. 7, an input or scan pulse is provided sequentially at outputs R0–R3 of chip 40; these pulses are transmitted as they appear from R0–R3 to the corresponding inputs of keyboard driver circuit 46. Driver circuit 46 is a conventional driver circuit used to amplify the pulses from R0–R3. The amplified pulses are transmitted by driver circuit 46 to the corresponding column input lines of keyboard 5. In this manner each column of keyboard 5 is scanned for new inputs, i.e. actuated keys, periodically, at a rate determined by the control program in the ROM of chip 40. As will become apparent from the description of the control routines which follow, each column is scanned once every four control intervals.

The output of keyboard 5 is coupled to chip 40 via a simple current limiting resistor network 50(2) and a capacitive interface circuit 50(1). Resistor network 50(2) merely places a large current limiting resistance on the order of 10K ohms in series with each keyboard output line. Capacitive interface circuit 50(1) serves the multiple functions of prioritizing keyboard outputs, encoding the keyboard output into a digital format recognizable by chip 40, and multiplexing this input to chip 40 with the zero crossing pulses from zero crossing detector 10, thereby enabling chip 40 to synchronize its control functions with zero crossings of the AC power line voltage.

In this embodiment, capacitive interface 50(1) is a TMS 1976 series integrated circuit, which is readily commercially available from Texas Instruments, Inc. As the details of this circuit are not critical to the presently claimed invention, its operation will be explained only to the extent necessary to an understanding of the present invention. Detailed information regarding the operation of this circuit in interfacing with a capacitive touch keyboard is provided in the 1977 TI publication entitled "TMS 1976 Capacitive Touch Keyboard Interface Manual.".

Briefly, interface 50(1) includes nine capacitive inputs, C1–C9 which are internally coupled to nine internal buffers (not shown). Each input is biased high through a very high resistance to a high input voltage level. The internal buffers are designed to detect negative transitions from an externally generated reference voltage. Each input buffer supplies a set commond to its associated internal latch (not shown) when an input voltage at its C input is detected which is different than the reference voltage. The output of these latches is communicated internally to an encoder (not shown) which in turn performs the functions of prioritizing and encoding. Input C-1 is assigned the highest priority and C-9 the lowest. The input received having the highest priority is encoded as a 4-bit BCD word and transmitted to an internal multiplexer.

The multiplexer portion of interface 50(1) is controlled by the input designated ISR. When ISR is low the BCD word is transferred to outputs Y1–Y4. A high level at input ISR unconditionally resets all the internal latches responsive to the C input lines and maintains this reset condition until the ISR input returns to a low level. When all latches are reset, the signal provided by the latches is the same as if no keys were pressed. In addition, when ISR is high, the F-input signal appears at output Y1. This function of the ISR line of selecting either the C input or the F input enables these inputs to be multiplexed into chip 40. Control of this multiplex function is accomplished via chip output port R8 which is electrically coupled to the ISR input of interface circuit 50(1) via ISR driver circuit 47.

Chip 40 receives the BCD coded 4-bit signal from interface 50(1), representing the scan output from keyboard 5 at inputs K1, K2, K4 and K8, which are electrically coupled to outputs Y1-Y4, respectively, of interface 50(1). As previously described, input K1 also couples chip 40 to zero crossing detector 10 via the F input of interface 50(1).

The outputs from chip 40 are transmitted from Oo-O7, R0-R3 and R4-R7, and R8. Outputs Oo-O7 provide display information to conventional 7 segment LED display 44 via segment display driver 41. Outputs R0-R3, as previously described, are coupled to columns S/U1-S/U4, respectively, via keyboard driver 46. Output R8 is coupled to the ISR input of interface 50(1) via ISR driver circuit 47. In addition, outputs R0-R3 are coupled to the input of a conventional display digit driver network 42 which enables display 44. Outputs R4-R7 couple chip 40 with the gate terminals of power control triacs 3(a)-3(d), respectively, via conventional triac driver circuits 26. The triac driver circuit 26 amplifies the outputs from R4-R7 and which isolates chip 40 from the power line.

It will be recalled that chip 40 is customized to perform the control functions of this invention by permanently configuring the ROM of chip 40 to implement a predetermined set of instructions. FIGS. 9-18 are flow diagrams which illustrate the control routines implemented in the microprocessor to obtain, store and process the input data from keyboard 5 via interface 50(1) and generate control signals for triggering triacs 3(a)-3(d) in a manner which provides the power pulse repetition rate required for the power setting selected for each of heating elements 1(a)-1(d). From these diagrams one of ordinary skill in the programming art can prepare a set of instructions for permanent storage in the ROM of microprocessor 40, which would enable chip 40 to perform the control functions of this invention.

III-A Control Program

The control program consists of a sequence of routines illustrated in the flow diagrams of FIGS. 9-18 which are contained in the Read Only Memory (ROM). The random access memory (RAM) in the TMS 1000 includes 64 words of storage, arranged in four files, each file containing 16 fourbit words. Two registers are used to address the RAM: The X register which is used to address one of the four files and the Y register which addresses one of 16 words in a file.

Referring back briefly to FIGS. 5A and 5B, it will be recalled that each heating element has associated with it one of the control logic networks 4(a)-4(d), and that these networks are cycled through in a staggered fashion with a different one being cycled through each control interval and a particular one being cycled through once every four control intervals.

The four control logic networks 4(a)-(d) are implemented in the control routine of this embodiment by using a different RAM file for each control logic network. Storage locations are provided in each RAM file to duplicate the functions performed by Memory 18, Master Counter 14, test means 30, control word generator 16, latches 32 and 36 and timers 34 and 38 for each control logic network. The functions of control logic network 4(a)-4(d) are performed by program instructions operating on RAM files 0-3, respectively. The set of program instructions is cycled through once during each control interval. Staggering is provided by having the file register function as a ring counter which counts from 0-3 and is incremented every control interval. This causes the control instructions to act on a different RAM file each control interval, with any one particular file being acted upon once every four control intervals. Only the storage locations in each RAM file which store the control word for that file are acted upon every control interval in performing the functions of power out logic network 24 and inhibit logic network 22. Although the particular control word for each file is generated only every four control intervals, the most significant bit of each word is tested during each control interval and each word is shifted left one bit each control interval so that a new bit is tested every control interval.

The initial pass through the program is initiated by the application of power to the system such as by plugging the apparatus into a power supply outlet. It should be noted that the control circuit is continually energized while the apparatus is plugged in regardless of the power setting selected. Upon entering the zero crossing routine (FIG. 15), the program pauses to await the occurrence of the next zero crossing of the voltage signal. Upon detection of a zero crossing signal the triac trigger decisions are communicated to the triac driver circuits by setting or resetting the output latches, R4-R7, the control words are then shifted (Power Out Routine, FIG. 16) and the program returns to the Scan Routine (FIG. 10) to begin the next cycle through the program.

A description of each routine with reference to the flow diagrams follows.

III-B Program Description

1. Power Up Routine-FIG. 9

This routine resets all the internal timers, latches and registers when power is initially applied, as when the range is plugged in or when power is restored following an interruption in power service. This routine is only re-entered following the initiation or restoration of service.

2. Scan Routine-FIG. 10

This routine, which is normally entered from the shift routine (FIG. 17), controls the input of data from capacitive interface 50(1) and also controls the output of display data to display element 44 for displaying the power settings being implemented.

The Input of data from interface 50(1) is accomplished by the following sequence of operations. First, the capacitive interface is reset by switching output latch R8 high (Block 90). This resets the internal input buffers of interface 50(1). Next, the SU counter is incremented (Block 92). The SU counter is a file register arranged to repetitively count from 0 to 3 and reset to 0 (Blocks 94 and 96). The RAM file addressed by SU is selected (Block 98) which enables a different RAM file to be operated on during each pass through the program, as described in the control program introduction description. Next, the keyboard scan output from the previous pass R(SU-1) is reset (Block 100). Capacitive interface 50(1) is then set (Block 101) by switching output latch R8 low, thereby preparing the internal latches at capacitive interface 50(1) to receive new input data. Display data representing the power setting currently being implemented are then transferred to the Oo-O7 ouputs (Block 102). Next, the keyboard scan for the new data for the heating element which corresponds to the count in the SU file register is initiated by actuating the scan output at R(SU) (Block 104). This enables the appropriate keyboard column and display digit. Finally the new data from capacitive interface 50(1) is read in (Block 106) and stored in temporary memory KB (Block 107). Having completed the retrieval of input data from the keyboard column associated with heating element SU, the program then branches to the input data routine (FIG. 11).

3. Input Data Routine-FIG. 11

This routine determines whether the newly entered data obtained by the scan routine and temporarily stored at KB represents a blank, i.e. no keyboard entry, an OFF setting, an ON setting, or one of settings 1–7.

In the event the new data represents a blank (Block 110) the permanent storage register PM which contains the control signal currently being implemented is undisturbed and the program braches to the power control routine (FIG. 13).

If the new data at KB represents an OFF setting (Block 112) this data is read into PM (Block 114), the Soft Start and Instant On latches and timers are reset (Blocks 115a–d), and the program branches to the Power Control routine (FIG. 13).

In the event the new data represents an ON setting (Block 116), additional testing is performed to determine the necessity of implementing the Soft Start mode. The control signal stored at PM is tested (Block 118) to determine if the previously entered setting was an OFF setting. If so, the newly entered ON setting stored at KB is read into PM (Block 120). If not, the contents of PM are undisturbed and the program branches to the Power Control Routine (FIG. 13). This latter situation indicates that the setting has either gone from ON to ON or from one of settings 1–7 to ON, in which case the new ON setting is ignored.

If the new data represents neither a blank, an OFF, nor an ON, as indicated by a NO response at Block 116, it must represent one of settings 1–7 in which case it is necessary to test the signals stored at PM to determine if the previously-entered setting was an OFF setting (Block 117). If YES, the contents of PM are undisturbed and the program branches to the Power Control Routine (FIG. 13). This situation indicates an attempt to go from OFF to one of power settings 1–7 without first selecting an ON setting. In such instances the new power setting is ignored. A NO answer at Block 117 indicates that the previous setting was either ON or one of power settings 1–7, in which case the program branches to the compare Routine (FIG. 12).

4. Compare Routine-FIG. 12

This routine is only entered when the new input represents one of power settings 1–7. The primary function of this routine is to initiate the Soft Start Mode and terminate the Instant On Mode when appropriate. This function is accomplished in the following manner. Block 122 tests PM for an ON setting. When PM contains the ON setting, indicating that the power setting has been changed from ON to one of power settings 1–7, the Soft Start Latch SSL is set (Block 124). The newly-entered power setting temporarily stored at KB is then transferred into PM (Block 125) and the program branches to the Power Control Routine (FIG. 13).

If PM is found to contain a setting other than an ON setting, (Block 122) (or OFF setting as previously described in the Input Data section), indicating a change from one to another of power settings 1–7, it is necessary to determine whether the newly-entered setting is lower than the setting currently being implemented. It will be recalled that one feature of the control scheme of this invention is that the Instant On Mode is immediately terminated if a new power setting less than the old setting is entered while operating in the Instant On Mode. As indicated in TABLE I, the power settings 1–7 are represented by BCD code representative of the decimal setting designation. Thus, a magnitude comparison is performed on the signals stored at PM and KB (Block 126). If the coded signal at KB is less than that at PM, then the new setting is lower and the Instant On Latch and Instant On Timer are reset (Blocks 128 and 129). If the signal stored at KB is not less than that at PM, the Instant On Latch and Timer are unchanged. In either event, the newly-entered signal initially stored at KB is then read into PM (Block 125). The program then branches to the Power Control Routine (FIG. 13).

5. Power Control Routine-FIG. 13

The main functions of the Power Control Routine are to increment the Master Counter each control period and implement the Soft Start and Instant On routines where appropriate. After incrementing the Master Counter (Block 150) which functions as a ring counter, repetitively counting from 0 to 15, the Soft Start Latch is tested (Block 152). If the Latch is set, indicating operation in the Soft Start Mode, the Soft Start Timer is incremented (Block 154) and the contents of the timer is tested against a reference constant designated Time Out for the purpose of limiting the duration of the Soft Start Mode (Block 156). When the contents of the timer exceed this value, the Soft Start Latch (Block 157) and Timer (Block 158) are reset and the Instant On Latch is set (Block 159). For a duration of one second Time Out is set at 15. The contents of registers MKB, a register used in implementing the Instant On Mode as explained hereinafter, and PM are exchanged (Block 155) at this point because the IOL is initially set in this loop, and the content of these registers are similarly exchanged in the Power Compare Routine (Block 168, FIG. 14B) without having cycled through the Block 164 of the Instant On Loop. The program then branches to block 146 of the Power Compare Routine to implement the Soft Start repetition rate independently of the actual power setting stored at PM.

When the Soft Start Latch is not set, the Instant On Latch (IOL) is tested (Block 160). When this latch is set, indicative of operation in the Instant On Mode, a register designated MKB is set equal to the highest power setting code, which in this embodiment is the BCD code for setting 7 (Block 161). The Instant On Timer is then incremented one count (Block 162) and tested (Block 163) to determine whether the count has exceeded a predetermined maximum (MAXTIME). If it has not, the contents of MKB and PM are exchanged (Block 164) causing PM to contain the signal corresponding to power level 7 rather than the actual power setting, thereby implementing the power pulse repetition rate associated with the Instant On Mode independently of the actual power setting. When the Instant On Timer exceeds the maximum count, the Instant On Mode is terminated by resetting the Instant On Latch and Timer (Blocks 165 and 166). For a duration of 8-½ seconds MAXTIME is set at 128. In either event, the program then branches to the Power Compare Routine (FIGS. 14A and B)

Figure 14B:
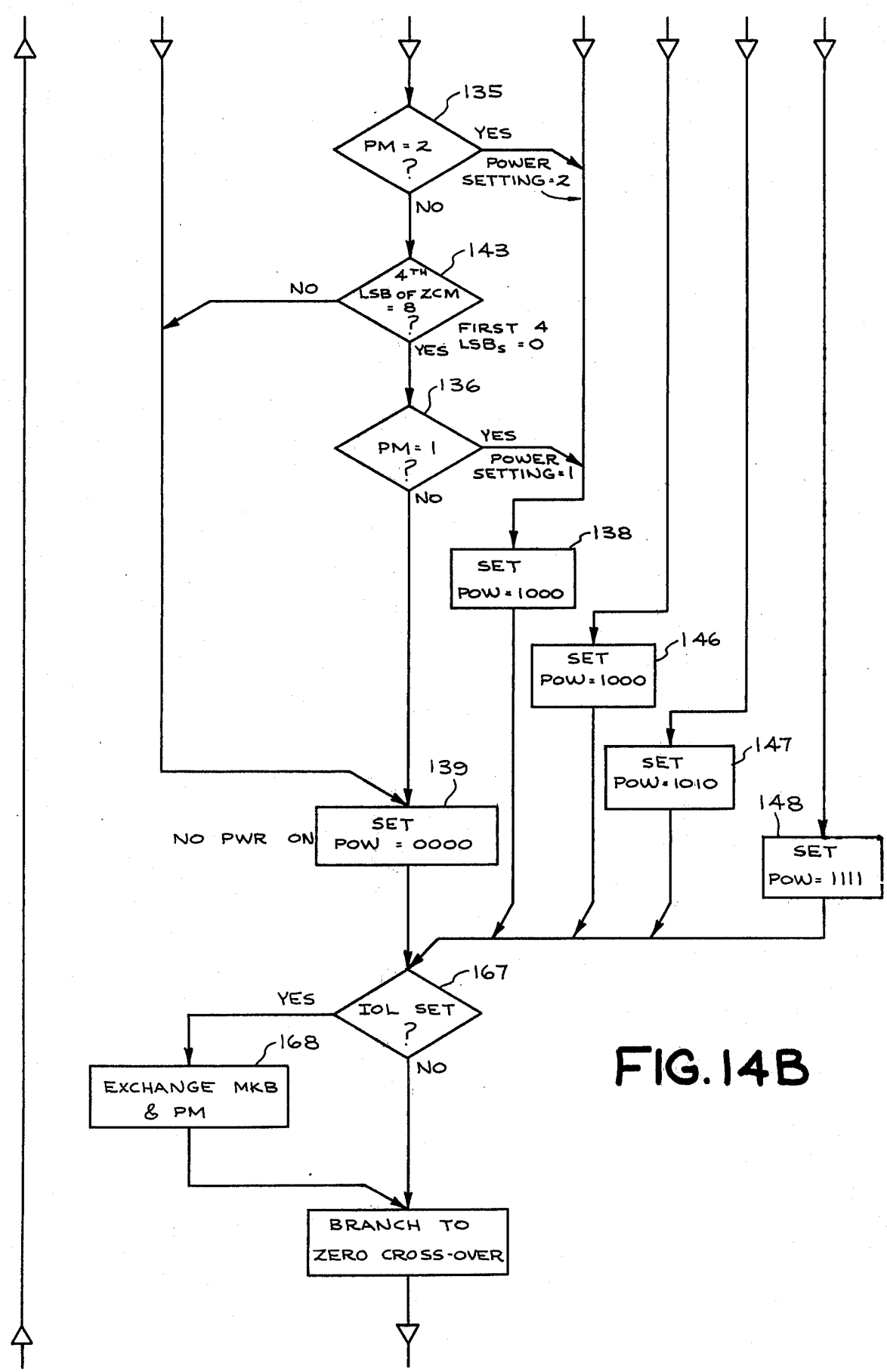

6. Power Compare (FIGS. 14A and 14B)

In this routine the 4-bit control word (POW) necessary to implement the proper power pulse repetition rate is generated. When one of power settings 5-7 is selected as indicated by the contents of PM=5-7, respectively (Blocks 130-132), POW is set equal to (1000), (1010) or (1111), respectively (Blocks 146-148). As previously discussed, the repetition rates required for these power settings are implemented by repetitively generating the appropriate one of these control words. Similarly, the Soft Start Mode is implemented by setting POW equal to (1000) (Block 146) when SSL is set (Block 152, FIG. 13).

To implement power settings 1-4, it is necessary to repetitively generate sequences of (1000)s and (0000)s. The appropriate sequence is implemented by testing both the contents of PM and the count (ZCM) of the Master Counter. For power setting 4, the proper sequence is alternating (1000) and (0000). Testing of the first least significant bit of ZCM for a zero (Block 140) will provide a YES answer every other count. When the answer is YES, and the contents of PM=4 (Block 133), POW is set equal to (1000) (Block 138). When the answer is NO, POW is set equal to (0000) (Block 139). Thus for power setting 4, PM=4, POW will alternate between (1000) and (0000) with each control period.

In the event the first 1st LSB is zero but the contents of PM do not equal 4, then the second LSB is tested for a zero (Block 141). A YES answer indicates that both the first and second least LSBs are zero, an event which occurs only once every four counts. When the answer is YES and the contents of PM=3, indicating power setting 3 has been selected, POW is set equal to (1000). If the second LSB is not zero, then POW is set equal to (0000). Thus, when the contents of PM=3, POW will equal (1000) once every four control periods and (0000) otherwise, thereby providing the desired sequence for power setting 3 of (1000) followed by three consecutive (0000)s.

In the event the answer at Block 134 is NO, this means that the power setting is not one of settings 3-7 and that the first two LSB's of ZCM are zero. The next step is to test the third LSB of ZCM for a zero (Block 142). If the answer is NO, POW is set equal to (0000). A YES answer indicating that the first three LSB's are zero, occurs once every 8 counts. If the answer is YES, and power setting 2 has been selected, PM=2 (Block 135), then POW is set equal to (1000). Thus, for power setting 2, POW will equal (1000) once every 8 control periods and (0000) otherwise, thereby providing the desired sequence of (1000) followed by seven consecutive (0000)s.

Finally, in the event the three LSB's of ZCM are zero and the contents of PM are not equal to 2, 3, 4, 5, 6, or 7, the fourth LSB is tested for zero (Block 143). In the event of a YES answer, indicating the first 4 LSB's are zeros, which occurs once every 16 counts, and power setting 1 has been selected (PM=1) (Block 136), then POW is set equal to (1000). Thus, for power setting 1, POW will equal (1000) once every 16 control periods and (0000) otherwise, thereby providing the desired sequence of (1000) followed by 15 consecutive (0000)s.

A NO answer at Block 136 indicates that an OFF power setting has been selected and POW is appropriately set equal to (0000).

Having generated the appropriate control word for the control period, it remains in this routine to determine whether the heating element is operating in the Instant On Mode by testing the Instant On Latch (IOL) (Block 167). If this latch is set, it is necessary to exchange the contents of MKB and PM to counter the original exchange which occurred in the Power Control Routine as a step in implementing the Instant On Mode. The program then branches to the zero crossover routine (FIG. 15).

7. Zero-Crossover Routine-FIG. 15

This routine resets the triac triggering output latches R4-R7 prior to the next zero crossing of the power signal (Block 170). Output R8 is switched high (Block 171) to set the ISR of capacitive interface 50(1) to enable the F input to interface 50(1), to pass through to the Y1 output. This allows the zero crossing pulse to appear at the K1 input. The program waits until the pulse appears at K1 (Blocks 172 and 173). When the pulse is received, the ISR input to interface 50(1) is reset (Block 174), and the program branches to the Power Out Routine (FIG. 16).

8. Power Out Routine-FIG. 16

This routine performs the functions of power out logic network 24 and inhibit logic network 22 (FIG. 5A). In this routine, during Steady State operation the control words (POW(a)-POW(d)) for the four heating elements are addressed (Blocks 181-184) and the most significant bit (MSB) of each control word is tested (Blocks 185-188). Those ones of output latches R4-R7 associated with control words having MSBs in the logical one state are set (Blocks 191-194). Those ones of output latches R4-R7 associated with control words having MSBs in the logical zero state are not set. In the latter case, these latches remain in the reset state since each of the latches R4-R7 were previously reset in the zero crossover routine (Block 170, FIG. 15). The setting of an output latch causes its associated triac to switch into conduction. Triacs associated with R output latches in the reset state remain non-conductive. In this fashion, during Steady State operation the most significant bit of each of the four control words is tested each pass through the control program. Consequently, a decision to trigger or not to trigger each triac is carried out each control interval.

The Soft Start Mode of operation, including the inhibit function, is also implemented by this routine. It will be recalled that a power pulse is applied to heating elements operating in the Soft Start Mode at a rate of one pulse per four control intervals. During that control interval in which power is applied to a heating element operating in the Soft Start Mode, power pulses are not applied to any other heating element regardless of the power settings for those other elements. This inhibit function is performed in this routine as follows. Upon entering this routine the Soft Start Latch associated with the heating element identified by the SU counter is tested (Block 180). If set, indicating that the heating element is operating in the Soft Start Mode, then that one of output latches R4-R7 associated with that heating element identified as R(SU+4) where SU is the count which identifies the heating element, is set (Block 195), and the program branches to the Shift Routine (FIG. 17). The remaining output latches, having been reset in the zero cross-over routine (Block 170, FIG. 15), remain unchanged, since the Steady State decision blocks, Blocks 181-188 and 191-194, are bypassed when SSL is set. In this fashion, power is inhibited to all the other heating elements independently of their power settings since only that one of output latches R4-R7 associated with the heating element operating in the Soft Start Mode is set.

9. Shift Routine-FIG. 17

This routine addresses and shifts the control word for each heating element left one bit positon. The Power Out and Shift Routines (FIGS. 16 and 17) accomplish the sequential left-to-right testing of the control word bits by testing the most significant bit position for each word and then shifting the bits of each word left during every control interval. In this manner, the control logic for each heating element is acted on each control period but a decision to turn ON/OFF is made every control interval. The program then returns to the Scan Routine (FIG. 10) to repeat the instructions on the next RAM file.

IV. Alternate Embodiment

Because of cost consideration, a microprocessor is the primary control element in the control circuit of a preferred embodiment of the present invention. However, the inventive concept is not intended to be limited to such an embodiment. The control scheme of this invention as illustrated by the functional block diagram of FIGS. 5A and 5B and the flow diagrams of FIGS. 9-17 can be implemented using hard wired digital logic circuitry, employing circuit components which are readily commercially available.

FIGS. 18-23 illustrate the logic circuitry for an alternate embodiment of the present invention using hard wired digital logic circuitry in lieu of a microprocessor. Those elements previously described retain their original numerical designations. The logic circuits illustrated are interfaced in a manner shown generally by the block diagram of FIGS. 5A and 5B.

In the logic circuitry to be described, the interface circuitry is omitted for purposes of clarity, such circuitry again being conventional and well known in the art.

IV-A Timing

In the microprocessor embodiment, the timing of logical events is inherently accomplished as a consequence of the serial nature of the microprocessor. Each instruction is performed in sequence, with only one instruction being capable of execution at any time. Thus, when the control interval is initiated by the input of a zero crossing pulse, the microprocessor steps through the instructions stored in the ROM. Proper ordering of the execution of the instructions in the ROM dictates the timing sequence.

Figure 24:
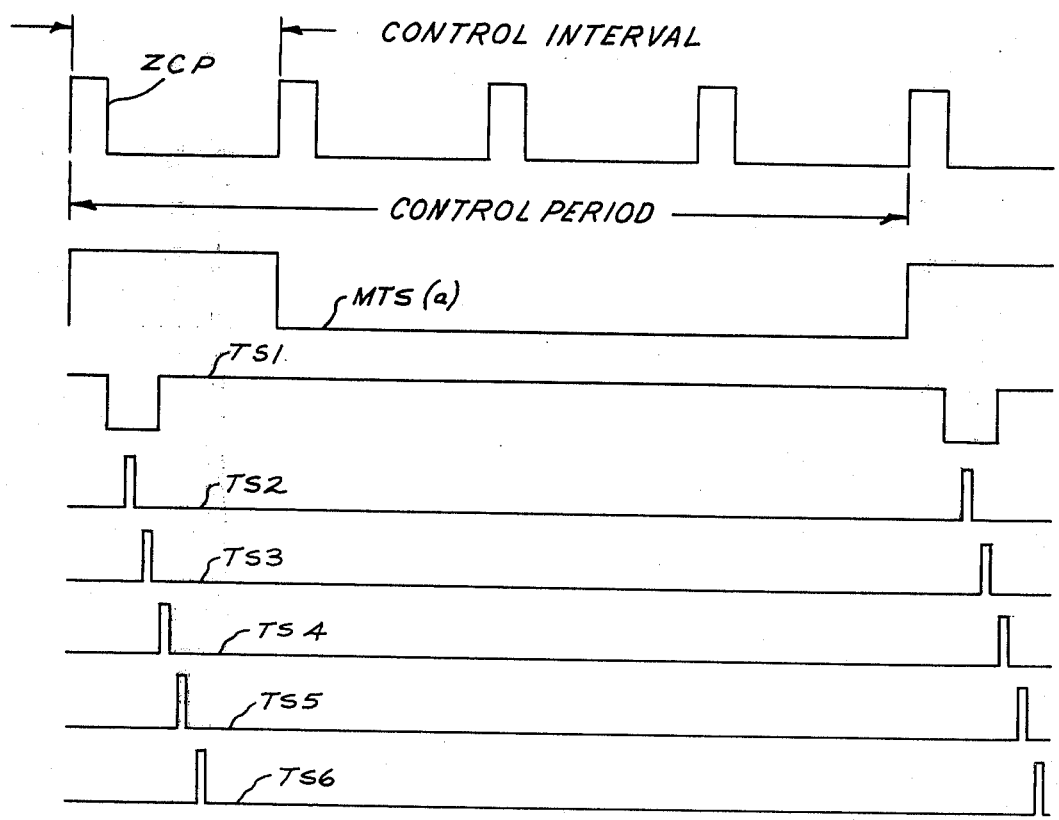
FIG. 24 is a timing diagram illustrating the various timing signals used in the digital logic embodiment of the invention.

In the digital logic circuit embodiment, the timing of events within each control interval is controlled by a timing circuit in each of control logic networks 4(a-)-4(d). Each of these timing circuits provides six timing signals, TS1-TS6, as illustrated in the timing diagram of FIG. 24 for logic network 4(a). Each timing circuit provides these timing pulses during the first control interval of the control period associated with its logic network and associated heating element. It will be recalled that the control period for each heating element is out of phase with every other heating element, and thus the internal timing signals are generated for only one control logic network during each control interval. This is controlled by enable signals MTS(a)-(d) generated by Master Timer 12, designated MTS(a)-(d), which successively enable the four control logic networks. Signal MTS(a) is shown in FIG. 24.

IV-B Operator Input Circuitry

Figure 18B:
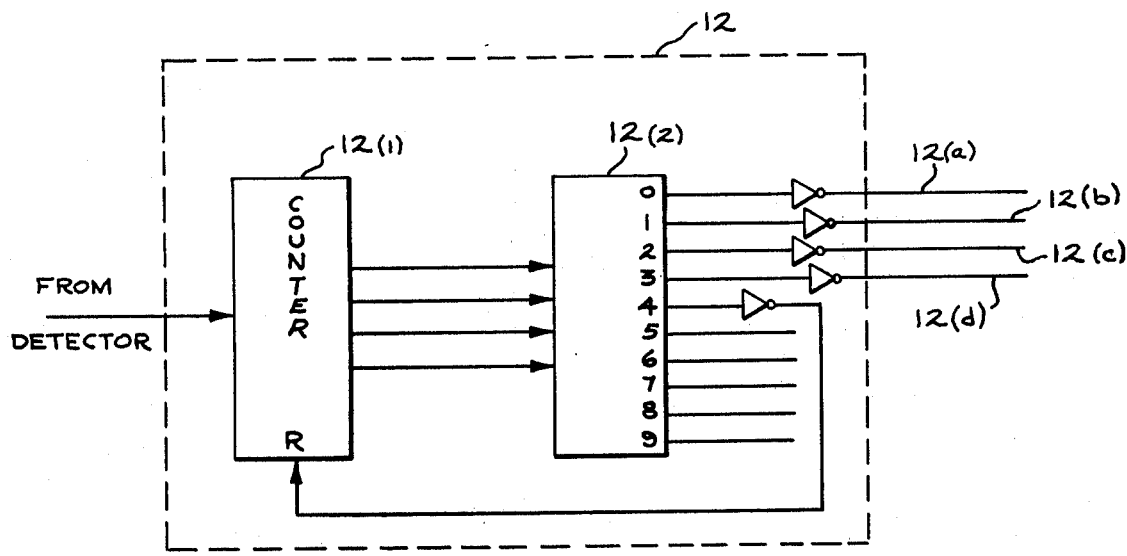
FIG. 18B is a logic diagram showing in greater detail the Master Timer of FIG. 5A for the digital logic embodiment of the invention.
Figure 18A:
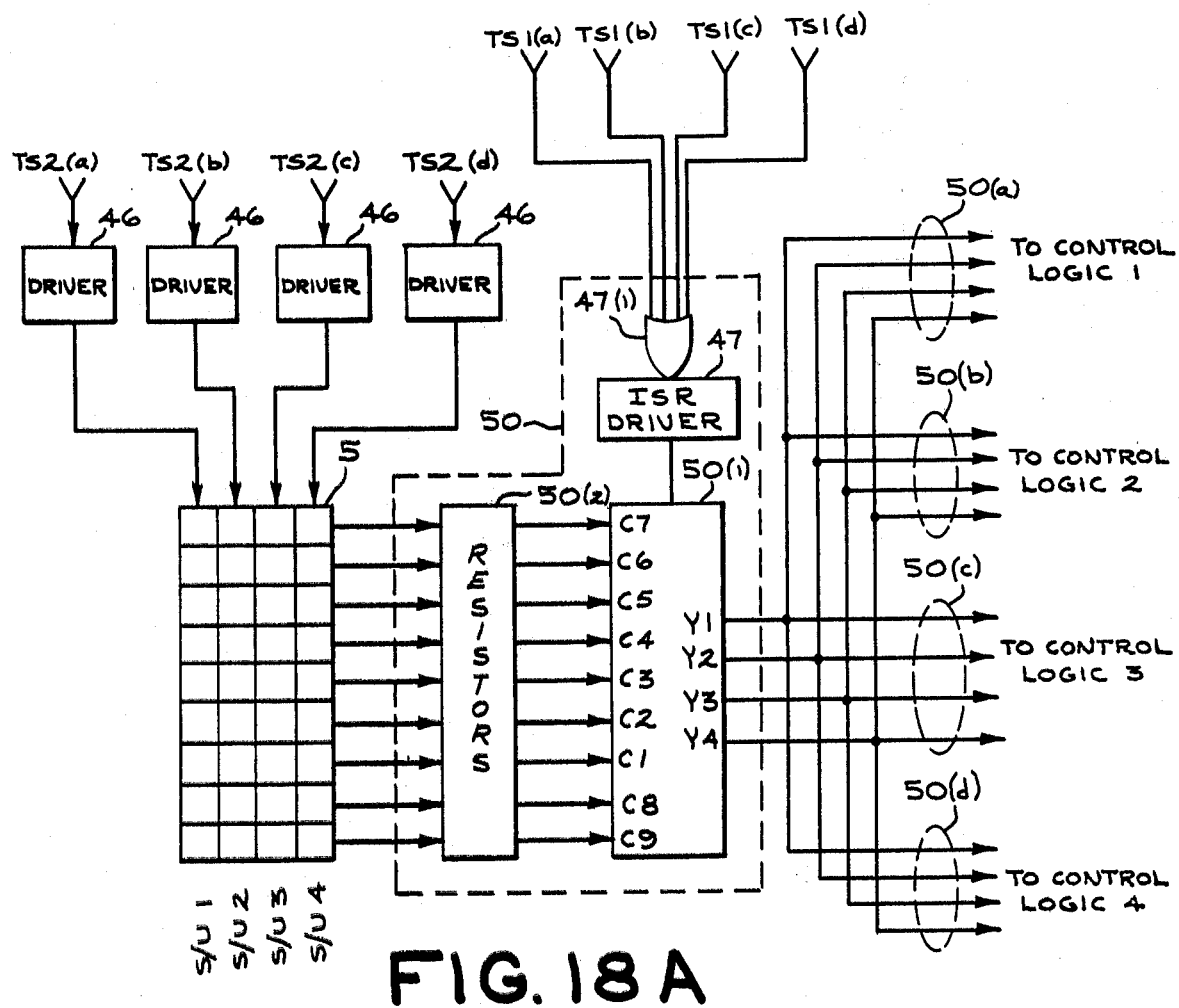
FIG. 18A is a block diagram showing in greater detail the keyboard and digital signal generator elements of FIG. 5A for the digital logic embodiments of the invention.

FIG. 18A illustrates schematically the circuits for implementing the functions of keyboard 5 and decoder 50 of FIG. 5A. The circuitry of FIG. 18A is the same basic circuitry previously described with reference to the microprocessor embodiment (FIG. 7), namely a capacitive touch keyboard 5, with decoder 50 comprising resistor network 50(2) and capacitive inerface 50(1). The difference being that interface 50(1) performs the encoding and prioritizing functions but does not multiplex zero-crossing pulses with the control signal data as in the microprocessor embodiement. Keyboard and ISR actuating signals are provided by the timing circuit of each control logic network. The first timing signal TS1 (FIG. 24) for each control logic network is coupled to the ISR input via OR gate 47(1) adn ISR driver circuit 47. Thus, a signal is provided at the ISR input during every control interval. A second timing signal TS2 (FIG. 24) is applied to the column associated with the currently enabled control logic network via driver circuit 46 to scan the column for an actuated key. Thus, only one column is scanned during each control interval. Table I shows the relationship between power setting and the output of capacitive interface 50(1). The 4-bit output generated by interface 50(1) is coupled to the input of each of four memory registers 18(1) of memory 18 (FIG. 19), one for each of control logic networks 4(a)-4(d). As will be more fully described with reference to the individual control logic networks, this data is provided to all four logic control networks every control interval, but is only read into the particular register of the network enabled by Master Timer 12 during that particular control interval.

IV-C Master Timer

Referring briefly to FIGS. 5A and 5B, it will be recalled that the function of Master Timer 12 is to sequentially enable the four control logic networks 4(a)-(d), enabling one control logic network each control interval. The enable signals designated MTS(a)-MTS(d) for networks 4(a) -4(d), respectively, generated by Master Timer 12, initiate the control period for the enabled logic network.

FIG. 18B illustrates schematically the logic circuit which performs the function of Master Timer 12. Counter 12(1) is a conventional 4-bit counter arranged to count zero crossing pulses from zero crossing detector 10. The four outputs of Counter 12(1) are connected to decoder 12(2), a conventional 4-line to 10-line BCD to decimal decoder readily available as an integrated circuit of the type identified by Serial No. SN 7442. The outputs of decoder 12(2), designated 12(a)-12(d) representing counts 0—3, respectively, provide the enabling signals MTS(a)-MTS(d), respectively. The output corresponding to count 4 is coupled to the reset input of counter 12(1). By this arrangement, counter 12(1) counts from 0 to 3 and resets to 0 every four zero crossing pulses. As counter 12(1) counts from 0 to 3, an enable signal appears at that one of outputs 12(a)-12(d) are coupled to the particular count of counter 12(1). Outputs 12(a)-12(d) are coupled to the enable input of the timing means 15 of each of logic networks 4(a)-4(d), respectively. Thus, an enable signal is provided sequentially to networks 4(a)-4(d), one being enabled each control interval. The enable signals provide by Master Timer 12 initiate the generation of internal timing signals for the enabled one of logic networks 4(a)-4(d).

IV-D Control Logic Networks

As shown in FIG. 5A, four individual control logic networks 4(a)-4(d) are provided, each being associated with the corresponding one of heating elements 1(a)-1(d). The following description is directed to logic circuits which make up these networks in this embodiment. The description is directed to network 4(a). Operation of the cirucits for this network is described for the control interval during which network 4(a) is enabled. It will be recalled that networks 4(a)-4(d) are enabled sequentially by Master Timer 12 with only one being during any one control interval. Thus the description of the operation of the circuits of network 4(a) is identically applicable to networks 4(b)-4(d) during subsequent control intervals.

IV-D.1. Timing Means

Each control logic network includes a timing circuit which responds to the enable signal from Master Timer 12 by generating a series of six timing signals TS1-TS6 as illustrated in the timing diagram of FIG. 24 to synchronize the operation of the control logic network. The enable signal from Master Timer 12 for logic network 4(a) is designated MTS(a) in FIG. 24. As shown, the six timing pulses are generated only in the control interval in which the MTS pulse is received.

The details of the timing circuit are not part of the present invention as claimd and thus the timing circuit will only be functionally described. Any of many conventional timing circuit arrangements for generating timing signals in accordance with the timing diagram of FIG. 24 such as are well known in the art may be used.

Figure 19:
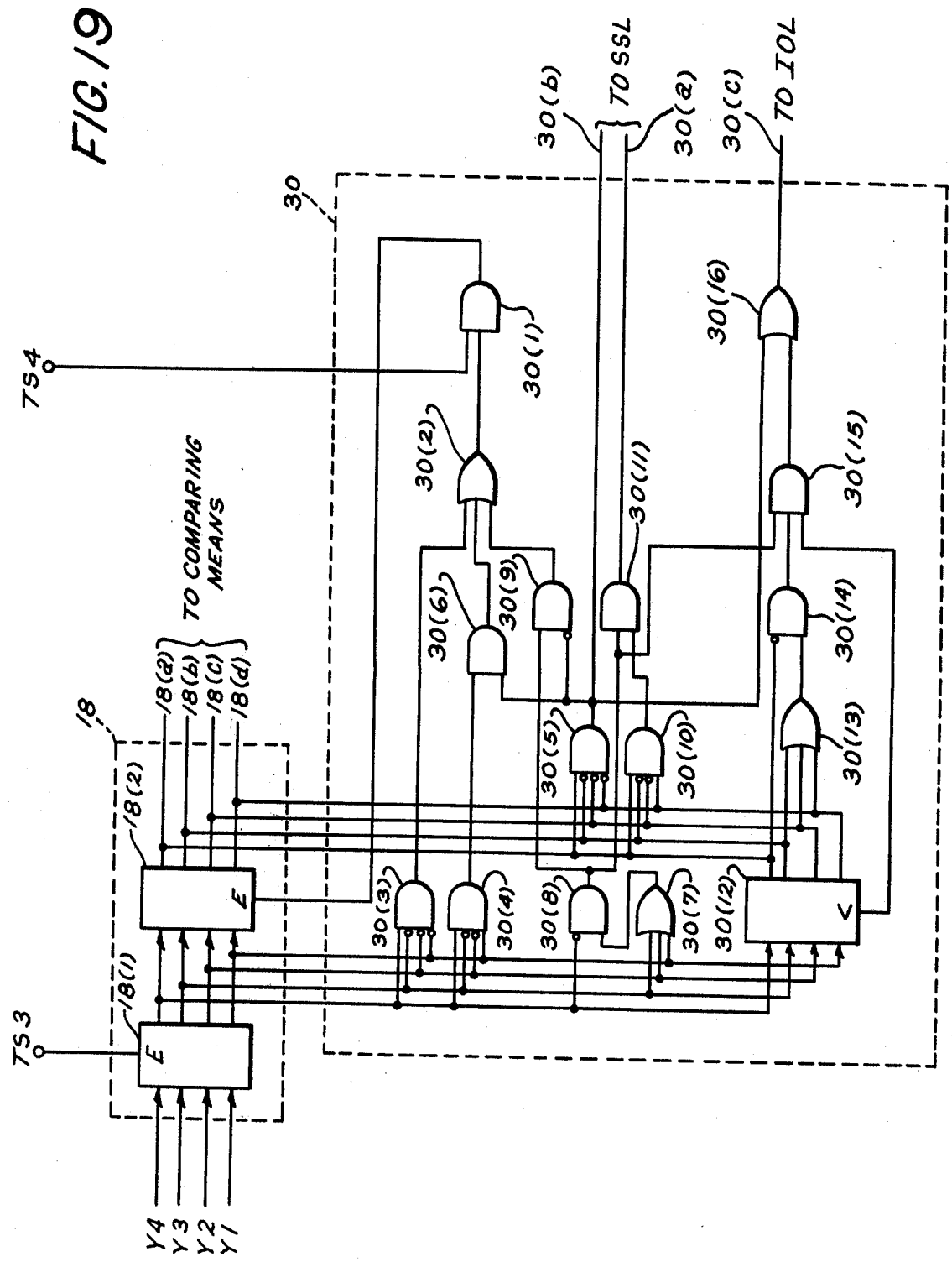
FIG. 19 is a logic diagram showing in greater detail the memory and test means of FIG. 5B for the digital logic embodiment of the invention.
Figure 21:
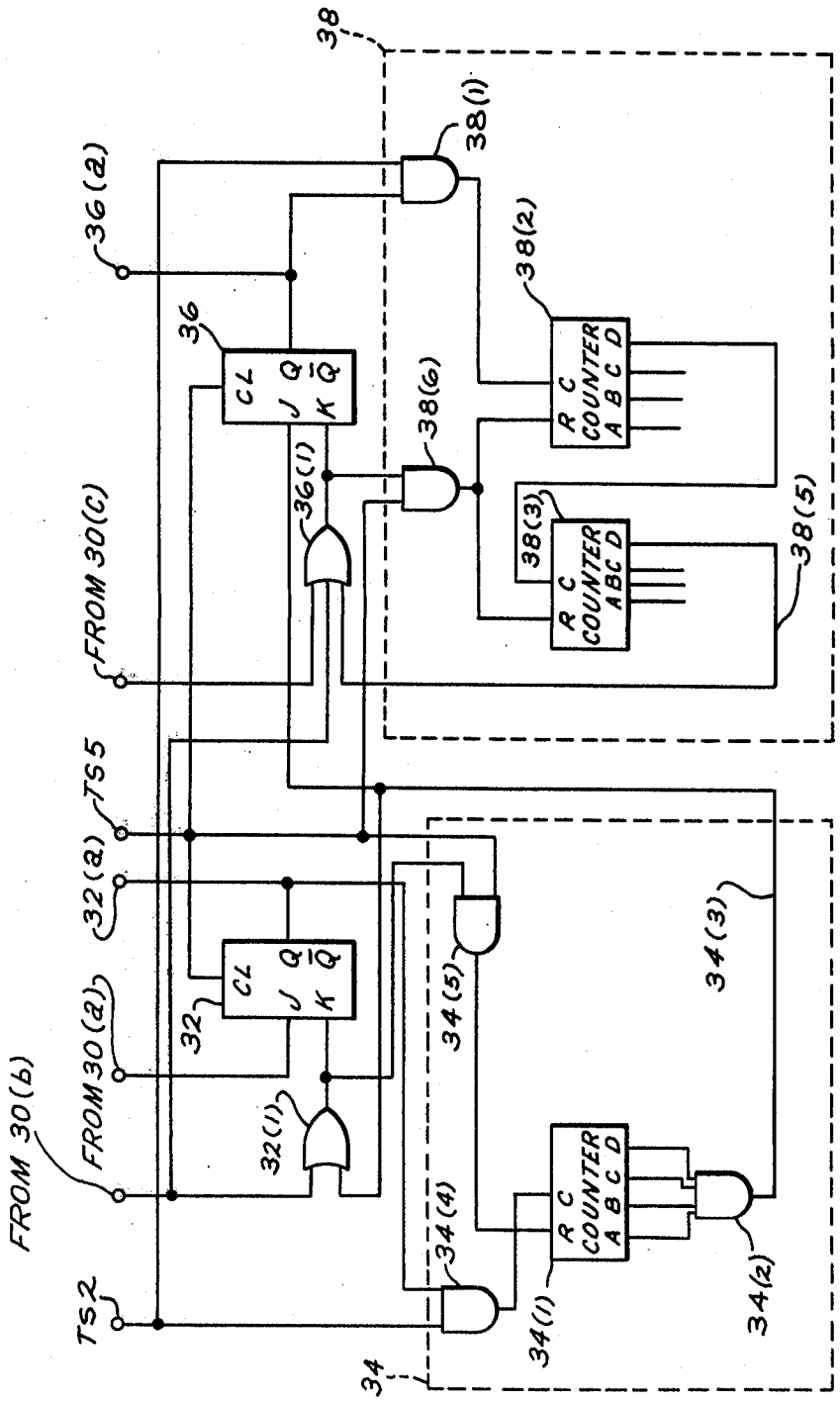
FIG. 21 is a logic diagram showing in greater detail the Soft Start Latch, Soft Start Timer, Instant On Latch and Instant On Timer of FIG. 5B for the digital logic embodiment of the invention.

Referring now to FIg. 24, curve ZCP represents the output of Zero Crossing Detector 10 (FIG. 5A). Curve MTS(a) represents one of the four outputs of Master Timer 12. Signals TS1-TS6 are employed to synchronize logic circuit operation within each control interval. TS1 is a negative going pulse which is applied to the ISR input of capacitive interface 50(1). The negative going pulse must be of sufficient duration to remain low long enough to allow the keyboard to be scanned by TS2 and the results of this scan read into register 18(1) of memory 18, when enabled by TS3. That is, TS1 must overlap TS2 and TS3. TS4 serves as an enable signal for register 18(2) of memory 18. This signal is gated to the enable input of register 18(2) via AND gate 30(1) of test means 30 (FIG. 19). Timing signal TS5 is applied to the clock input of Soft Start Latch 32 and Instant On Latch 36 to update the outputs of these latches in response to the new scan results (FIG. 21). Comparing means 16 then updates its output in accordance with the updated latch information. Timing signal TS6 is applied to the Power Out Logic (FIGS. 5A and 22) to enable the control word to be read into the associated control word storage register 24(1)(a). The timing circuit waits for the next enable signal from Master Timer 12 which initiates the next control period for that logic network.

IV-D.2. Memory

FIG. 19 illustrates the logic circuitry for implementing memory 18, and test means 30 of FIG. 5B. In this embodiment, memory 18 includes a temporary memory 18(1) designated KB and a permanent memory 18(2) designated PM. It should be noted that KB is updated every control period to store the results of the scan of the associated keyboard column. PM is only updated when an actuated key is identified during the scan of that column. Each of these elements is essentially comprised of a 4-bit parallel-in/parallel-out storage register of the type readily available as an integrated circuit by the serial number SN 74194.

Register 18(1) receives and stores the control signal from interface 50(1). This signal is clocked to the output of register 18(1) by timing signal TS3 of the timing diagram of FIG. 24. The output of register 18(1) is tested by test means 30 in a manner to be described. An output from gate 30(2) of test means 30 then enables register 18(2) when appropriate by sending a pulse to the enable input (E) of register 18(2) thereby eanbling the reading of the coded signal stored in register 18(1) into register 18(2). The contents of register 18(1) is unchanged by this event.

IV-D.3. Test Means

Test means 30 enables the new signal temporarily stored in register 18(1) to be read into register 18(2) only when (1) the new signal stored is an OFF signal; or (2) the new signal is on ON signal and the old signal stored at register 18(2) is an OFF signal; or (3) the new signal is one of power settings 1-7 and the old signal is not an OFF signal. In additon, test means 30 resets the Soft Start Latch and the Instant On Latch when an OFF signal is stored in register 18(2). By virtue of condition (1), an OFF signal is always read into 18(2); condition (2) insures that the ON setting is selected prior to one of power settings 1-7 when changing from an OFF condition and also that an ON setting is ignored if the old signal is one of power settings 1-7; and (3) allows changes from one to another of power settings 1-7. It should be noted that a blank input, representing a condition in which no actuated key is detected, is inherently excluded by allowing the enabling of register 18(2) only under conditions (1), (2), or (3), as just described.

Test means 30 of this embodiment will be described with reference to the logic diagram of FIG. 19. The output of logical AND gate 30(1) is coupled to the enable input of register 18(2). When the output of gate 30(2) is a logical one, the signal at register 18(1) is read into register 18(2). Gate 30(1) serves to synchronize the enabling of register 18(2) with timing signal TS4 (FIG. 24) by ANDing the TS4 signal with the output of logical OR gate 30(2), which is a logical one when any one of conditions (1), (2), or (3) is satisfied. The presence of an OFF signal (1000) at register 18(1) is detected by logical AND gate 30(3) which has as inputs the four outputs at register 18(1). The inputs to gate 30(3) corresponding to the three least significant bits of the signal at register 18(1) are inverted. Thus, the output of gate 30(3) is a logical one when an OFF signal represented by the signal (1000) is stored at register 18(1). The output of gate 30(3) is coupled to the enable input of register 18(2) via gates 30(2) and 30(1).

The presence of an ON signal at register 18(1) is detected by logical AND gate 30(4), which has as inputs the outputs of register 18(1). The inputs to gate 30(4) corresponding to the second and third least significant bits of the signal at register 18(1) are inverted. Thus, the output of gate 30(4) is a logical one when an ON signal (1001) is stored at register 18(1). The output of gate 30(4) is coupled to the enable input of register 18(2) via gates 30(6), 30(2) and 30(1). An OFF signal at register 18(2) is detected by logical AND gate 30(5) which has as inputs the four outputs of register 18(2).

The inputs to gate 30(5) corresponding to the three least significant bits of register 18(2) are inverted. Thus, the output of gate 30(5) is a logical one when an OFF signal (1000) is stored at register 18(2). Logical AND gate 30(6) ANDs the outputs of gates 30(4) and 30(5). Thus, the outputs of gate 30(6) is a logical one when the new signal at register 18(1) is an ON signal and the old signal at register 18(2) is an OFF signal. The output of gate 30(6) is coupled to the enable input at register (18)2 via gates (30)2 and 30(1).

The preference of a signal representing one of power settings 1-7 at register 18(1) is detected by gates 30(7) and 30(8). Logical OR gate 30(7) has as inputs the outputs at register 18(1) corresponding to the three least significant bits. Consequently, the output at gate 30(7) is a logical one for a signal representing any non-blank signal at register 18(1). Logical AND gate 30(8) ANDS the output of gate 30(7) with an inverted input corresponding to the most significant bit of register 18(1). As shown in Table I, the most significant bit is a logical one for settings ON and OFF and a logical zero for power settings 1-7. Thus, the output of gate 30(8) is a logical one when the signal at register 18(1) represents any one of power settings 1-7 and a logical zero otherwise. Logical AND gate 30(9) ANDs the output of gate 30(8) with the inverted output of gate 30(5). Consequently, the output of gate 30(9) is a logical one when the output of gate 30(8) is a logical one and gate 30(5) is a logical zero, indicating that the signal at register 18(1) corresonds to one of settings 1-7 and the signal at register 18(2) is not an OFF setting. The output of gate 30(9) is coupled to the enable input of register 18(2) via gates 30(2) and 30(1).

Test means 30 sets Soft Start Latch 32 (FIG. 21) when: (a) register 18(1) contains a signal representing one of power settings 1-7; and (b) register 18(2) stores an ON signal. Condition (a) is identified by a logical one at the output of logical AND gate 30(8) as hereinbefore described.

Condition (b) is detected by AND gate 30(10) which has an inputs the output lines from register 18(2), the lines representing the second and third least significant bits being inverted, so that the output of gate 30(10) is a logical one only when the signal stored in register 18(2) is an ON signal (1001). The outputs of gates 30(8) and 30(10) and ANDed by logical AND gate 39(11). The output of 30(11), designated 30(a), is coupled to the set input of Soft Start Latch 32 (FIG. 21). A logical one is thus applied to set SSL when conditions (a) and (b) above are satisfied.

Test means 30 resets Instant On Latch 36 (FIG. 21) when the signal at register 18(1) represents a lower power setting than that represented by the signal in register 18(2). This is accomplished by comparator 30(12) which performs a magitude comparison of the contents of the two registers.

In the circuit of FIG. 19 this function is performed by comparator 30(12) and gates 30(5), 30(8), and 30(13)-30(15). A comparison of the contents of the registers 18(1) and 18(2) is continuously performed by comparator 30(12), which is a conventional 4-bit magnitude comparator of the type readily available as an integrated circuit identified by the serial number SN 7485. When the magnitude of the contents of register 18(1) is less than the contents of register 18(2), such as occurs when the newly entered power setting is a lower setting is a lower setting than the previously entered setting, the output of comparator 30(12) is a logical one.

This output is coupled to AND gate 30(15) which ANDs this output with the outputs of AND gates 30(8) and 30(14). As just described, the output of AND gate 30(8) is a logical one when the contents of register 18(1) represents any one of power settings 1-7. The output of logical AND gate 30(14) which ANDs the inverted most significant bit of register 18(2) with the output of logical OR gate 30(13) which ORs the three least significant bits of register 18(2), similarly is a logical one when register 18(2) contains a code representing any one of power settings 1-7. Thus, gate 30(15) gates the results of the comparison to the reset input of Instant On Latch 36 (FIG. 21) via logical OR gate 30(16) whenever registers 18(1) and 18(2) both contain codes representing any one of power settings 1-7. When the above condition is satisfied and the power setting represented in register 18(1) is lower than that in register 18(2), the output of gate 30(15), and consequently the output of gate 30(16) designated 30(c), is a logical one which results in the resetting of Instant On Latch 36.

The output of gate 30(5) is also coupled to the reset input of Instant On Latch 36 via OR gate 30(16). Consequently, latch 36 is similarly reset when an OFF setting (1000) is stored in register 18(2).

Finally, the output of gate 30(5), designated 30(b), is coupled directly to the reset input of Soft Start Latch 32. Consequently, Soft Start Latch 32 is reset when an OFF signal is stored in register 18(2).

IV-D.4. Master Counter

The Master Counter 14 of FIG. 5B is implemented in this embodiment by a 4-bit ripple counter which counts enabling pulses provided by Master Timer 12 (FIG. 18B). It should be noted that an enabling pulse is provided to a particular control logic network every four control intervals. Counter 14 may be of the type readily available as integrated circuits identified by the serial number SN 7493.

IV-D.5. Control Work Generating Means

Figure 20:
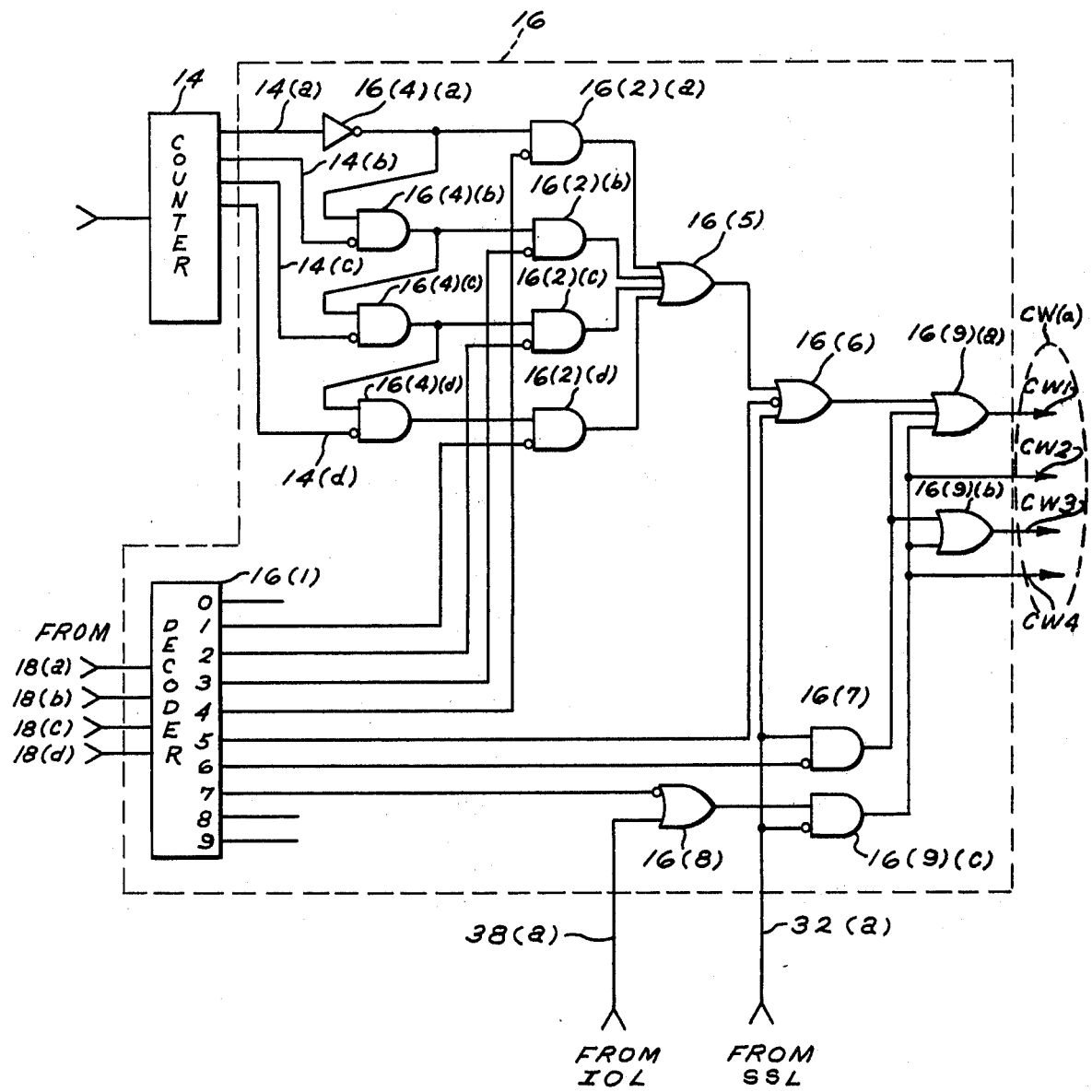
FIG. 20 is a logic diagram showing in greater detail the control word generator of FIG. 5B for the digital logic embodiment of the invention.

The logic circuit for this embodiment of control work generating means 16 (FIG. 5B), as illustrated in FIG. 20, essentially comprises a 4-line to 10-line binary to decimal decoder 16(1) and a network of logic gates including gates 16(4)(a)-16(4)(d), designated counting gates, responsive to the four outputs from Master Counter 14, designated 14(a)-14(d), representing the four bits of the count; gates 16(2)(a)-16(2)(d), designated comparing gates, responsive to the outputs from the counting gates and those outputs from decoder 16(1) representing power settings 1-5; gates 16(9)(a)-16(9)(d) designted encoding gates, the outputs of which comprise the 4-bit control word; and coupling gates 16(5), 16(6), 16(7) and 16(8).

This circuit generates one of the following 4-bit control words (0000), (1000), (1010) or (1111) during the first control interval of its control period. The particular word generated is a function of the power setting selected, the count of the Master Counter and the operating mode, the latter being determined by the state of the Soft Start and Instant On Latches 32 and 36 (FIG. 21).

It will be recalled that power settings 5-7 and the Soft Start and Instant On modes may be implemented by repetitively generating the appropriate one of the above described control words; and that for power settings 1-4, a sequence of (1000)s and (0000)s must be repetitively generated. The particular sequence associated with each power setting is the same as previously described for the microprocessor embodiment.

Referring to FIG. 20, decoder 16(1) identifies the power setting to be implemented by decoding the output from register 18(2) of memory 18 (FIG. 20) present at lines 18(a)–18(d). It will be recalled that register 18(2) stores a BCD coded signal representing the power setting being implemented. Decoder 16(1) has one output uniquely associated with each power level setting. Outputs 1–7 of decoder 16(1) are associated with power settings 1–7, respectively. (Lines 0, 8 and 9 are not used in this embodiment.) The power setting represented by the coded input to decoder 16(1) is identified by a logical zero on the associated decoder output line. Outputs on all other output lines are logical ones. For example, when the coded input represents power setting 3, the output decoder on line 3 is a logical zero and the output on the other lines are all logical ones. Decoder 16(1) is a conventional 4 to 10 line BCD to decimal converter of the type readily available commercially as an integrated circuit identified by the serial number SN 7442.

Encoding gates 16(9)(a)–16(9)(c) provide the 4-bit control word at outputs CW1–CW4; CW1 being the most significant bit and CW4 being the least significant bit.

The output of encoding gate 16(9)(c) is coupled to outputs CW1 and CW3 via logical OR gates 16(9)(a) and 16(9)(b), respectively, and directly to outputs CW2 and CW4. Consequently, a logical one output at gate 16(9)(c) results in control word (1111) appearing at outputs CW1–CW4. Gate 16(9)(c) is a logical AND gate which ANDs the inverted output of Soft Start Latch 32 (SSL)(FIG. 5B) with the output of logical OR gate 16(8). Logical OR gate 16(8) ORs inverted output 7 of decoder 16(1) with the output of Instant On Latch 36 (IOL)(FIG. 21). Consequently, the output of 16(9)(c) is a logical one only when SSL 32 is reset (i.e., its output is a logical zero) and either output 7 of decoder 16(1) is a logical zero (enabled) or IOL 36 is set. Similarly, the output of gate 16(9)(c) and consequently outputs CW2 and CW4 are logical zeros (disabled) either when SSL 32 is set, or when a setting other than 7 is selected and IOL is reset.

Encoding gates 16(9)(a) and 16(9)(b) couple the outputs of logical AND gate 16(7) to outputs CW1 and CW3, respectively. Gate 16(7) ANDs inverted output 6 from decoder 16(1) and the output from SSL 32. Thus, the outputs of gate 16(7) and consequently gates 16(9)(a) and 16(9)(b) are logical one when output 6 of decoder 16(1) is a logical zero and SSL 32 is reset, thereby generating control word (1010) at outputs CW1–CW4.

Control word (1000) is generated under the following three conditions: (1) the Soft Start mode is in progress, i.e. SSL 32 is set; (2) during Steady State operation, power setting 5 is selected; or (3) one of power settings 1–4 is selected and the proper count of counter 14 is detected. Condition 3 will be described in detail further on. Considering condition (1) above, the output of SSL 32 is a logical one when SSL is set. This output is coupled to output CW1 via OR gate 16(9)(a). Consequently, CW1 is a logical one when SSL 32 is set. The output from SSL 32 is also, as previously described, an inverted input to AND gates 16(7) and 16(9)(c). Consequently, when the SSL output is a logical one, the output of each of these gates is a logical zero. Consequently, CW2–CW4 are logical zero. Thus, control word (1000) appears at lines CW1–CW4.

Considering next, condition (2), when setting 5 is selected output 5 of decoder 16(1) is a logical zero and the other outputs are logical ones. Also, during steady state operation, both SSL 32 and IOL 36 are reset. Consequently, the outputs of gates 16(7) and 16(9)(c) are logical zeros, causing logical zeros to appear at CW2–CW4. Output 5 of decoder 16(1) is inverted and coupled to output CW1 via logical OR gate 16(6) and 16(9)(a). Consequently, when output 5 is a logical zero, a logical one appears at CW1, resulting in the control word (1000) at CW1–CW4.

Regarding condition (3) above, it will be recalled that for power settings 1–4 repetitive sequence of control words (1000) and (0000) are generated. To provide the desired sequence of control words for each power setting, use is made of a relationship between the repetition rate for control word (1000), expressed generally as $\frac{1}{2}^n$, and the binary count of Master Counter 14, which enables a control word repetition rate of $\frac{1}{2}^n$ to be implemented by generating control word (1000) whenever the first n least significant bits of counter 14 are all logical zeros. For example, power setting 4 requires a repetitive sequence of control words beginning with control word (1000) followed by seven consecutive (0000) control words or a repetition rate for control word (1000) of $\frac{1}{8}$ corresponding to $\frac{1}{2}^n$ where n=3. The desired repetition rate of $\frac{1}{8}$ is achieved by generating the control word (1000) whenever the first three least significant bits of the counter are logical zeros, which occurs once every 8 counts.

In implementing these sequences the count from counter 14 is processed by counting gates 16(4)(a)–16(4)(d) in the following manner. The input on lines 14(a)-(d) from counter 14 represent the 1st–4th least significant bits of the count respectively. Gate 16(4)(a) is a logical inverter, the output of which is a logical one when the first least significant bit is zero. The output of gate 16(4)(a) is ANDed with the inverted input from line 14(b) by logical AND gate 16(4)(b) such that the output of gate 16(4)(b) is a logical one only when the first two least significant bits are zero. Similarly, the output of gate 16(4)(b) is ANDed with the inverted input on line 14(c) by logical AND gate 16(4)(c) thereby causing the output of gate 16(4)(c) to be a logical one only when the first three least significant bits are zero. This pattern is similarly repeated for gate 16(4)(d).

Comparing gate 16(2)(a)–16(2)(d), respectively, AND the individual outputs from counting gates 16(4)(a)–(16(4)(d) with the inverted outputs 4–1 from decoder 16(1), respectively; that is, logical AND gate 16(2)(a) ANDs the output of gate 16(4)(a) with inverted decoder output line 4; gate 16(2)(b) ANDs outputs from gate 16(4)(b) and decoder line 3; and so on. Each of the comparing gates can be viewed as uniquely associated with that particular power setting represented by its input line from decoder 16(1). When arranged in this fashion, the output of at most one of the comparing gates 16(2)(a)–16(2)(d) can be a logical one during any control interval, and the output of any one of the comparing gates will be a logical one only when the least significant bit pattern associated with the power setting with which the comparing gate is associated occurs. For example, when power setting 3 is is to be implemented, decoder output 3 is a logical zero, and the remaining decoder outputs are logical ones. Thus, the inverted decoder output which is the input to gate 16(2)(b) is a logical one and the inverted inputs to the remaining comparing gates are logical zeros. Thus the outputs of the comparing gates other than 16(2)(b) will remain logical zero regardless of the count of counter 14. The output of gate 16(2)(b), however, will be a logical one whenever the first two least significant bits from counter 14 are zero, as indicated by a logical one at the output of gate 16(4)(b). Thus, for power setting 3, the output of gate 16(2)(b) will be a logical one once every four counts.

The outputs of comparing gates 16(2)(a)–16(2)(d) are coupled to the output of control word generating means 16, via logical OR gates 16(5), 16(6) and 16(9)(a).

Logical OR gate 16(5) ORs the outputs of comparing gates 16(2)(a)–16(2)(d), and, accordingly, the output of gate (16(5) will be a logical one whenever the output of any of the comparing gates is a logical one. A logical one at the output of gate 16(5) results in the generation of control word (1000).

IV-D.6. Latches and Timers

As previously described, in the initiation, duration and termination of the Soft Start and Instant On modes, use is made of latches and timers.

FIG. 21 illustrates that portion of the control circuit which includes Soft Start Latch 32, Soft Timer 34, Instant On Latch 36 and Instant On Timer 38 for the present embodiment. Latches 32 and 36 are conventional J-K flip-flops of the type readily available commercially as integrated circuits identified by serial number SN 7470.

As illustrated in FIGS. 19 and 21, the J input of SSL latch 32 is coupled to the output of gate 30(11) of test means 30, designated 30(a). The Q output of latch 32 is coupled to the input of gate 16(6), gate 16(7), and gate 16(9)(c) of comparing means 16, via line 32(a). The Q output is also coupled to timer 34.

In operation when test means 30 determines that implementation of the Soft Start mode is required, a logical one appears at the output of gate 30(11) of test means 30 (FIG. 19). The Q output of latch 32 then switches to a logical one when clocked by timing signal TS5 (FIG. 24) and remains a logical one until a logical one signal is subsequently clocked through via the K input of latch 32. When reset, the output of latch 32 switches to a logical zero and remains zero until the Soft Start mode is subsequently required.

Timer 34 controls the duration of the Soft Start operating mode by counting a predetermined number of TS2 timing signals (FIG. 24) when enabled by the set state of the latch and subsequently resetting itself and the Soft Start Latch. In this embodiment a duration of approximately one second is required. This is achieved by using a 4-bit counter 34(1) and using the output of logical AND gate 34(2) which ANDs the four outputs of counter 34(1) to reset latch 32 and counter 34(1). At the 16th count, a logical one will appear on line 34(3), the output of gate 34(2) causing counter 34(1) and latch 32 to reset. It will be recalled that timing signal TS2 is generated in synchronism with enabling pulses from Master Timer 12 which are provided to any one of control logic networks 4(a)–4(d) once every four control intervals. Thus, the frequency of the TS2 timing signals is 15 Hz. Thus, a count of 15 pulses satisfactorily approximates the desired one-second duration.

The counting of TS2 signals by counter 34(1) of timer 34 is enabled by the output of latch 32 which is ANDed with timing signal TS2 via logical AND gate 34(4). Consequently, the TS2 signals are gated through gate 34(4) to the clock input of counter 34(1) when latch 32 is set and blocked when latch 32 is reset.

Latch 32 and counter 34(1) of timer 34 are reset upon the occurrence of either of the following events: the counting of a predetermined number of counts; or the entry of an OFF signal in register 18(2) (FIG. 19). Logical OR gate 32(1) couples output 30(b) from test means 30 and output 34(3) to the K input of latch 32. Consequently, a logical one at either output 30(b) indicating entry of an OFF setting or 34(3) indicating the occurrence of the 16th count will result in a logical one at the output of gate 32(1), thereby resetting latch 32.

A logical one at the output of gate 32(1) also resets counter 34(1) in synchronism with timing signal TS5 (FIG. 24). The output of gate 32(1) is coupled to the reset input of counter 34(1) via logical AND gate 34(5) which ANDs the output of gate 32(1) with timing signal TS5. A logical one output at gate 34(5) resest counter 34(1).

Operation of the Instant ON Latch 36 (IOL) and Instant On Timer (IOT) 38 are very similar to that of the Soft Start Latch and timer just described. Latch 36 is set by the same signal which resets latch 32, namely a logical one at output 34(3) of counter 34(2) which is coupled to the J input of latch 36. Setting of latch 36 enables timer 38 by gating timing signal TS2 to the input of the timer via AND gate 38(1). The duration of the Instant On Mode is controlled by timer 38 which counts a predetermined number of TS2 pulses. This is achieved using two 4-bit counters 38(2) and 38(3) cascaded to act as an 8-bit counter. In this embodiment the desired duration of the Instant On Mode of 8–½ seconds is closely approximated by counting 128 TS2 pulses. At the start of the 129th count the output of counter 38(3), designated 38(5) corresponding to the most significant bit, is a logical one. Output 38(5), is coupled to the K input of flip-flop 36 via OR gate 36(1). Thus, after counting 128 TS2 signals, the Instant On Latch is reset. Gate 38(1) then blocks any further pulses from the timer input until the IOL is again set.

Resetting of counters 38(2)–38(3) of timer 38 is accomplished by coupling the output of gate 36(1) to the reset inputs of each of these counters via logical AND gate 38(6). Gate 38(6) synchronizes the resetting of the counters with timing signal TS5 by ANDing the signal from gate 36(1) with timing signal TS5.

Latch 36 is also reset by either a logical one at output 30(c) of test means 30 (FIG. 19) indicating the selection of a lower power setting, or a logical one at ouptut 30(b) representing the entry of an OFF signal. These outputs are coupled to the K input of latch 36 via OR gate 36(1).

The counters 34(1) and 34(2), and 38(2)–38(3) employed in timers 34 and 38, respectively, are of the type readily available commercially as integrated circuits identified by the serial number SN 5493.

IV-E. Power Out Logic

Figure 22:
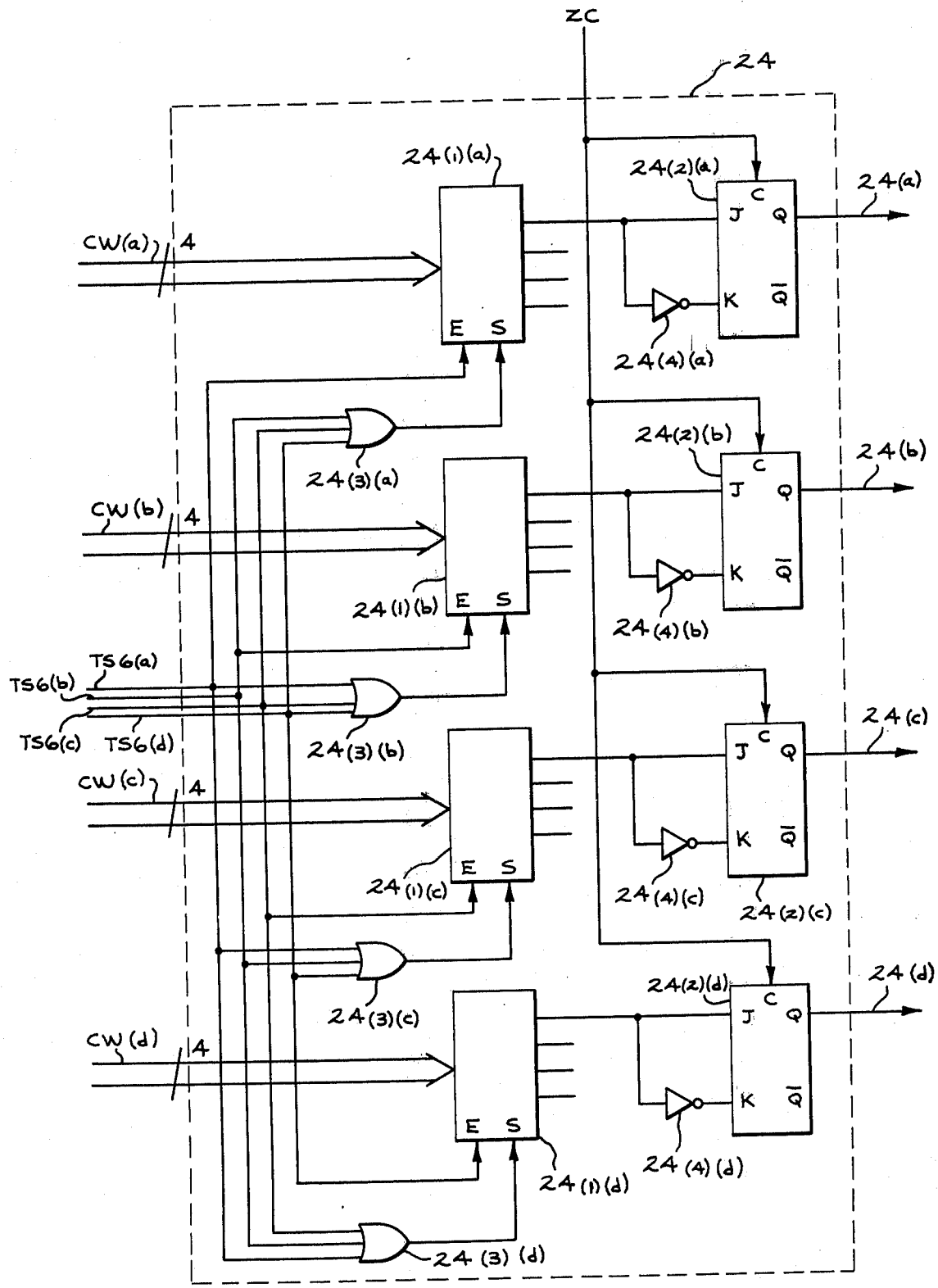
FIG. 22 is a logic diagram showing in greater detail the power out logic block of FIG. 5A for the digital logic embodiment of the invention.

The logic circuit illustrated in FIG. 22 performs the function of power out logic network 24 of FIG. 5A. Shift registers 24(1)(a)–24(1)(d) receive and store control words CW(a)–CW(d) from control logic networks 4(a)–4(d), respectively, in successive control intervals. A 4-bit control word is entered into the associated one of registers 24(1)–24(4) when timing signal TS6 from timing means 15 of the associated one of control logic networks 4(a)–4(d) is applied to the enable input (E) of that register. This signal is provided during the first control interval of the control period for the associated one of heating elements 1(a)-1(d). The control word for the next control logic network is entered into its associated register during the next control interval which is the first control interval for its control period. This continues successively through all four logic networks in a repetitive manner synchronized with by Master Timer 12, as previously described.

Since the control periods for the respective heating elements are staggered, during any particular control interval, one register is enabled to receive a new control word and the contents of the other three registers are shifted left one position prior to testing the most significant bit. This allows each bit of each control word to be sequentially tested from left to right, one bit each control interval.

The timing signal which is applied to the enable input of the associated register is also coupled via logical OR gates 24(3) to the shift inputs of the other three shift registers. For example, during the first interval of the control period for heatigng element 1(a), control logic network 4(a) generates control word CW(a) which appears as a 4-bit signal at the data input of storage register 24(1)(a). Timing means 15 of control logic network 4(a) sends a timing pulse TS6(a) which is applied to the enable input of storage register 24(1)(a) allowing the new control word to be read into that register. This signal is also applied to the shift left inputs of registers 24(1)(b)-24(1)(d) via OR gates 24(3)(b)-24(3)(d), respectively, causing the contents of these registers to be shifted left one position.

The output of each of registers 24(1)(a)-24(1)(d) corresponding to the most significant bit of the register is coupled directly to the J input and via the associated one of logic inverters 24(4)(a)-24(4)(d) to the K input of its associated one of latches 24(2)(a)-24(2)(d). A logical one in the most significant bit position sets the associated latch upon the next occurrence of a zero crossing pulse from detector 10 (FIG. 5A); and, similarly, a logical zero in this bit position resets the latch, when the zero crossing pulse is received.

Shift registers 24(1)(a)-24(1)(d) are of the type readily available commercially as integrated circuits identified by the serial number SN 74194. Latches 24(4)(a)-24(4)(d) are conventional J-Kflip-flops identical to that described with reference to the Soft Start and Instant On Latches.

The outputs of latches 24(2)(a)-24(2)(d), designated 24(a)-24(d), respectively, are coupled to the gate terminals of triacs 3(a)-3(d), respectively, via inhibit logic network 22 and triac driver 126. In this fashion, the triggering of triacs 3(a)-3(d) is synchronized with power signal zero crossings.

IV-F. Inhibit Logic Circuit

Figure 23:
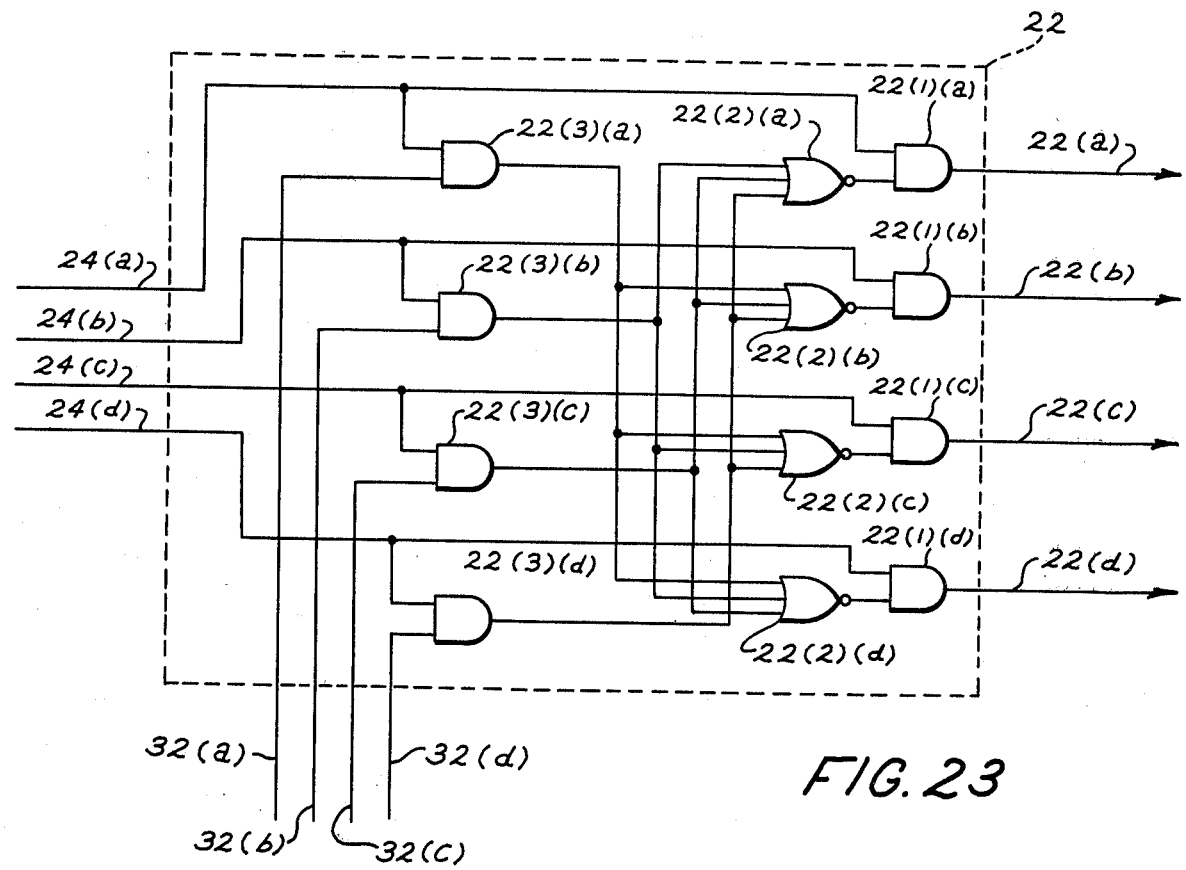
FIG. 23 is a logic diagram showing in greater detail the inhibit logic block of FIG. 5A for the digital logic embodiment of the invention.

The logic circuit illustrated in FIG. 23 performs the functions of inhibit logic network 22 (FIG. 5A). As hereinbefore described, due to the staggered manner in which the four heating elements are controlled, power is applied to, at most, one heating element operating in the Soft Start mode during any one control interval. The function of inhibit logic circuit 24 is to identify those control intervals in which power is to be applied to a heating element operating in the Soft Start mode and to inhibit the application of power to the other three heating elements during that interval.

The detection function in the circuit of FIG. 23 is performed by logical AND gates 22(3)(a)-22(3)(d) which respectively AND the trigger outputs 24(a-)-24(d) from power out logic circuit 24 (FIG. 22) with outputs 32(a)-32(d) from the Soft Start Latches of control networks 4(a)-4(d). A logical one output for one of AND gates 22(3)(a)-22(3)(d) indicates that the associated trigger signal is a logical one and the associated Soft Start Latch is set. Thus, when the output of one of gates 22(3)(a)-22(3)(d) is a logical one, the trigger signals for the other triacs are to be inhibited.

The inhibit function is performed by logical AND gates 22(1)(a)-22(1)(d) designated inhibit gates, in combination with logical NOR gates 22(2)(a)-22(2)(d). Inhibit gates 22(1)(a)-22(1)(d) respectively AND inputs from 24(a)-24(d) with the outputs of gates 22(2)(a)-22(2)(d).

The output of each of detection gates 22(3)(a)-22(3)(d), is coupled to each of the inhibit gates 22(1) except its associated inhibit gate via NOR gates 22(2). For example, the output of gate 22(3)(a) is coupled to gates 22(1)(b)-22(1)(d) via NOR gates 22(2)(b)-22(2)(d), respectively. Thus a logical one output of a particular one of detection gates 22(3)(a)-22(3)(d) results in a logical zero at one of the inputs and, consequently, at the output of each of inhibit gates 22(1) except that one associated with the particular detection gate.

The outputs 22(a)-22(d) of gates 22(1)(a)-22(1)(d), respectively, are coupled to the gate inputs of triacs 3(a)-3(d), respectively, via conventional triac driver networks 26. A logical one at an output causes the associated triac to be switched into conduction; a logical zero output causes the associated triac to become non-conductive at the next zero crossing of the AC power signal.

As an example of circuit operation, assume heating element 1(a) is operating in the Soft Start mode. Thus, input 32(a) is a logical one. During the control interval in which power is to be applied to heating element 1(a) as determined by power out logic 24, input 24(a) is also a logical one, with the result that the output of detection gate 22(3)(a) is a logical one, the outputs of NOR gates 22(2)(b)-22(2)(d) are logical zeros, and the outputs of gates 22(1)(b)-22(1)(d) are logical zeros. The outputs of gates 22(3)(b)-22(3)(d) are necessarily logical zeros, since as aforementioned, at most one of these gates can be a logical one during any one control interval, with the result that the output of NOR gate 22(2)(a) is a logical one. Thus, output 22(a) of gate 22(1)(a) is a logical one. As a result, triac 3(a) is triggered into conduction and triacs 3(b)-3(d) are non-conductive, regardless of the state of signals 24(b)-22(d) from power out logic circuit 24.

It should be noted that in the event none of the heating elements are operating in the Soft Start mode, the output of each of NOR gates 22(2)(a) is a logical one, thereby allowing the outputs 24(a)-24(d) of power out logic circuit 24 to be passed directly through inhibit circuit 22 to the triac driver.

The illustrative embodiments herein described have employed a control interval of one full power cycle duration. However, it will be apparent to one skilled in the art that a half-cycle control interval could be similarly employed. In that instance the power pulses applied would be one half-cycle of the power signal rather than a full cycle. The advantage of employing the half-cycle control interval is that for the same range of cooking temperatures use of a half-cycle control interval allows OFF times between power cycles which are one half that of the full cycle case at each power setting except for the 100% setting. Consequently, stress on circuit components resulting from current surges is reduced using a half-cycle control interval. However, the disadvantage of the half-cycle approach for the repetition rate provided in the embodiments herein disclosed is that the power pulses, with the exception of the maximum power setting, would be of the same polarity, resulting in a d.c. component of current being drawn from the power source. Clearly, use of the full cycle control interval eliminates this d.c. component.

Other modifications and alterations of this invention will become apparent to those skilled in the art from the foregoing discussion and it should be understood that this invention is not limited to the specific embodiments described. It is intended to cover by the following claims all modifications coming within the spirit and scope thereof.

What is claimed is:

1. A power control arrangement adapted for connection to a pulsating power supply for controlling the power output of a plurality of heater elements comprising:
    an operator control including an OFF setting and means for selecting desired power levels for each element,
    means for generating a pulse train, the time between pulses defining a control interval,
    logic means responsive to said operator control for generating a binary control word representing a selected power level for each heating element, each word including a plurality of bits, and
    means for controlling power to each of said elements during any given interval as a function of the state of a selected one of said bits in the control word associated with said element,
    detecting means associated with each element for detecting a transition from said OFF setting to a desired power level for its associated element,
    means associated with each element responsive to said detecting means for defining a transition period of predetermined duration for its associated element, initiated by said detection of said transition, and
    means for inhibiting power to all other elements during those control intervals in which power is applied to a heating element operating in its transient period.

2. The combination recited in claim 1 wherein said means for controlling power to said elements includes means for coupling and decoupling said element to said supply depending on whether said selected bit is in a first or second state, respectively.

3. The combination recited in claim 2 wherein said means for defining a transient period comprises:
    a latch responsive to said detecting means, said latch switching to a set state upon the detecting of said transition, and
    a timer arranged to repetitively count a predetermined number of said pulses, and reset, said latch being coupled to said timer such that said latches switches to a reset state upon counting of said predetermined count.

4. The combination recited in claim 3 wherein said means for inhibiting power to all other elements comprises means responsive to the state of said latch and said selected bit for generating an inhibit signal, said signal being in a first state when said latch is in said set state and said selected bit is in said first state, and a second state otherwise.

5. The combination recited in claim 4 further including gating means responsive to said inhibit means for decoupling all other elements from said supply when said inhibit signal for any one element is in said first state.

6. In a system, adapted for connection to a power supply, having a plurality of heating elements and an operator control including an OFF setting and a power setting for selecting a desired power level for each element, the improvement comprising:
    means for detecting the transition of any one of said elements from said OFF setting to a power setting,
    means for defining a transient period for each element of predetermined duration initiated by the detection of said transition for said element, and
    means for inhibiting power to all other elements when power is applied to any one element operating in its transient period.

7. The combination recited in claim 6 wherein said heating elements are characterized by relatively low resistance at room temperature, a relatively high resistance at operating temperature, and a rapid thermal response whereby relatively high current is drawn by said element when power is applied to said element at room temperature.

8. The combination recited in claim 7 wherein said transient period is of sufficient duration to allow the resistance of a heating element operating in its transient period to increase from said relatively low resistance to a level near said relatively high level.

9. A power control system for controlling the power output of a plurality of heating elements comprising:
    means for electronically defining repetitive control intervals,
    means for generating control words, each word associated with a different element, each word representing a desired power output from its associated element, each word including a plurality of bits, the bits of a selected word operative to control power to the element associated therewith over a plurality of intervals, and
    means for controlling the application of power to each element over a plurality of control intervals as a function of the state of different bits in the word associated with said element, wherein each bit of a word is characterized by a first or second state, and by a position value within its associated word, and wherein said means for controlling the application of power includes means for controlling power to different elements during any given interval in accordance with the state of bits having different position value in their associated words.

10. The combination recited in claim 9 wherein a different one of said control word generating means is enabled to generate a control word during each control interval, and further including similar shift registers for storing said words, each register having a plurality of similarly designated bit storage locations, means for shifting said registers in unison, and wherein said means for controlling power tests a similarly designated location of each register during a given interval to control power during said given interval to a plurality of elements.

11. The power control system recited in claim 9 further including means for electronically defining repetitive control periods, said periods comprising a plurality of control intervals, and means for updating said control word for each element once during each period.

12. The power control system recited in claim 11 wherein the number of elements equals the number of control intervals in a control period, and the number of bits in each word equals the number of elements.

13. A power control system adapted for connection to a power supply for controlling the power output of a plurality of heater elements in response to operator selected power level settings comprising:
   a plurality of control word generating means responsive to said operator selected power level settings, each control word generating means associated with a different one of said heater elements, each of said control word generating means operable, when enabled, to generate a binary control word representing the power level selected for its associated heating elements.
   timing means for defining repetitive control intervals of fixed duration,
   means for successively enabling a different one of said control word generating means during each control interval, and
   means for controlling power to each of said elements in any given interval as a function of the bit pattern of its associated control word, whereby control of power to each of said elements is displaced in time with every other element by at least one control interval.

14. The combination recited in claim 13 wherein a control period is associated with each heating element, said control period for any particular element being initiated concurrently with the enabling of the control word generating means associated with that element, each control period comprising a number of control intervals equal to the number of bits in the associated control word.

15. The combination recited in claim 13 wherein the number of bits in the control word generated for each element equals the number of heating elements.

16. The combination recited in claim 14 wherein said means for controlling power includes means for testing one bit of each stored control word during each control interval and further includes means for controlling the power to a particular element during each control interval as a function of the state of the bit of its associated control word tested for that control interval.

17. The combination recited in claim 16 wherein said means for testing one bit of each control word during each control interval comprises means for testing successive bits of each control word during successive control intervals.

18. The combination recited in claim 17 wherein said storage means for storing associated with each element comprises a shift register associated with each element, and said means for testing successive bits comprises means for testing the same bit position in each of said registers every control interval and means for shifting said control word in each of said registers one bit position during each control interval, whereby the bit tested for each word during any particular interval represents a different significant bit for each control word.

19. The combination recited in claim 16 wherein said means for controlling power comprises means for coupling and decoupling each heating element and the power supply when the bit of its associated control word tested by said test means is in a first and second state, respectively.

20. The combination recited in claim 19 wherein said means for testing one bit of each control word each control interval comprises means for testing a different bit of each word during each control interval, the bit tested for each during any particular control interval representing a different significant bit position for each word.

21. The combination recited in claim 14 wherein said power supply is a pulsating supply and said timing means comprises means for generating a pulse train in synchronism with said supply, the time between selected pulses comprising said control interval.

22. The combination recited in claim 14 wherein said supply is an AC supply and said timing means comprises means for generating pulses in response to zero crossovers of said supply, the time between pulses comprising said control interval.

23. A power control system for controlling the output power of a plurality of heating elements in response to a power level selected by an operator from a plurality of available power settings comprising:
   input means for generating a control signal representing the operator selected power level for each heating element,
   means associated with each heating element for storing the control signal representing its selected power level,
   means for defining repetitive control intervals of fixed duration,
   means associated with each heating element responsive to said input means for generating a control word comprising a plurality of bits, the bit pattern of said word being a function of the selected power level, the number of bits in each word defining a control period for its element comprising a number of control intervals equal to the number of bits,
   test means for testing one bit of each word each control interval;
   means responsive to said test means for controlling the application of power to each element as a function of the state of the bit of its control word tested by said test means,
   said control word generating means being enabled to generate a control word once during its control period.

24. The combination recited in claim 23 wherein the control word generating means associated with a different one of said heating elements is enabled each control interval.

25. The combination recited in claim 24 wherein the number of bits in the control word, and accordingly the number of control intervals in the control period, is equal to the number of heating elements whereby a control word is generated for one heating element during each control interval, the control word for any particular heating element being generated every n control interval, n being the number of heating elements.

* * * * *